US012240556B2

(12) United States Patent
Komada et al.

(10) Patent No.: US 12,240,556 B2
(45) Date of Patent: Mar. 4, 2025

(54) DEVICE FOR HUMAN-POWERED VEHICLE

(71) Applicant: SHIMANO INC., Sakai (JP)

(72) Inventors: Yasuyuki Komada, Sakai (JP); Yuichiro Hidaka, Sakai (JP)

(73) Assignee: SHIMANO INC., Sakai (JP)

( * ) Notice: Subject to any disclaimer, the term of this patent is extended or adjusted under 35 U.S.C. 154(b) by 303 days.

(21) Appl. No.: 17/709,319

(22) Filed: Mar. 30, 2022

(65) Prior Publication Data

US 2023/0312041 A1 Oct. 5, 2023

(51) Int. Cl.
*B62J 43/30* (2020.01)
*B62K 23/06* (2006.01)

(52) U.S. Cl.
CPC .............. *B62J 43/30* (2020.02); *B62K 23/06* (2013.01)

(58) Field of Classification Search
CPC ........... B62J 43/30; B62J 45/20; B62K 23/06; B62L 3/02
USPC ......................................................... 74/502.2
See application file for complete search history.

(56) References Cited

U.S. PATENT DOCUMENTS

| 10,988,209 B1* | 4/2021 | Luman ..................... B62L 3/023 |
| 2008/0210045 A1* | 9/2008 | De Perini .............. B62K 23/06 |
| | | 74/502.2 |
| 2012/0221204 A1* | 8/2012 | Ichida .................... B62K 25/04 |
| | | 701/37 |
| 2019/0002053 A1* | 1/2019 | Kakinoki ............... B62K 19/40 |
| 2019/0359069 A1* | 11/2019 | Usui ....................... B60L 50/66 |
| 2021/0139105 A1* | 5/2021 | Komada ................ B62K 23/06 |
| 2022/0306231 A1* | 9/2022 | Hidaka ................... B62L 3/023 |
| 2022/0355890 A1* | 11/2022 | Kosaka .................. B62K 23/06 |
| 2023/0067171 A1* | 3/2023 | Brown ................... B62K 23/02 |
| 2023/0312042 A1* | 10/2023 | Masuda .................. B62J 43/00 |

FOREIGN PATENT DOCUMENTS

DE 102022112144 A1 * 11/2023

OTHER PUBLICATIONS

Translation of DE-102022112144-A1, Hirota et al., Nov. 16, 2023 (Year: 2023).*

* cited by examiner

*Primary Examiner* — Vinh Luong
(74) *Attorney, Agent, or Firm* — MORI & WARD, LLP

(57) ABSTRACT

A device for a human-powered vehicle comprises a communication electrical contact. The communication electrical contact is contactable with an electrical contact of an electric device. The electrical contact has a first state where the electrical contact receives electricity from a power supply and a second state where the electrical contact is in contact with the communication electrical contact. The communication electrical contact is configured to be in contact with the electrical contact to allow communication between an external device and the electric device via the communication electrical contact and the electrical contact in the second state of the electrical contact.

18 Claims, 28 Drawing Sheets

DEVICE FOR HUMAN-POWERED VEHICLE

BACKGROUND

Technical Field

The present invention relates to a device for a human-powered vehicle.

Background Information

A human-powered vehicle includes an electric unit powered by a power source. The electric unit receives data such as firmware updates and a change in settings from another device for maintenance. The electric unit generally has a power source holder and a data receiving port which is a separate port from the power source holder. This may complicate the structure of the electric unit. It is preferable to simplify the structure of the electric unit while receiving electricity from the power source and date from another device.

SUMMARY

In accordance with a first aspect of the present invention, a device for a human-powered vehicle comprises a communication electrical contact. The communication electrical contact is contactable with an electrical contact of an electric device. The electrical contact has a first state where the electrical contact receives electricity from a power supply and a second state where the electrical contact is in contact with the communication electrical contact. The communication electrical contact is configured to be in contact with the electrical contact to allow communication between an external device and the electric device via the communication electrical contact and the electrical contact in the second state of the electrical contact.

With the device according to the first aspect, the communication electrical contact allows communication between the external device and the electric device via the communication electrical contact and the electrical contact in the second state of the electrical contact. Thus, it is possible to utilize the electrical contact to receive electricity from the power supply and to receive the information from the external device. Accordingly, it is possible to simplify the structure of the electric device while receiving electricity from the power supply in the first state and the information from the external device in the second state.

In accordance with a second aspect of the present invention, the electric device according to the first aspect further comprises a connection port electrically connected to the communication electrical contact. The connection port is configured to be connected to a connector electrically connected to the external device.

With the device according to the second aspect, the connection port can connect the device and the external device. Thus, it is possible to electrically connect the communication electrical contract and the external device via the connection port.

In accordance with a third aspect of the present invention, the electric device according to the first or second aspect further comprises a wired communicator electrically connected to the communication electrical contact to communicate with the electric device via the communication electrical contact.

With the device according to the third aspect, it is possible to establish communication between the device and the electric device via the wired communicator, the communication electrical contact, and the electrical contact.

In accordance with a fourth aspect of the present invention, the electric device according to any one of the first to third aspects further comprises an additional power supply electrically connected to the communication electrical contact to supply electricity to the electric device via the communication electrical contact and the electrical contact.

With the device according to the fourth aspect, it is possible to supply electricity to the device and the electric device from the additional power supply. This enables the device and the electric device to communicate with each other using electricity supplied from the additional power supply.

In accordance with a fifth aspect of the present invention, the electric device according to any one of the first to fourth aspects further comprises a wireless communicator electrically connected to the communication electrical contact to wirelessly communicate with the external device.

With the device according to the fifth aspect, the wireless communicator enables the device to wirelessly communicate with the external device. Thus, it is possible to use the device without an electric cable, improving user-friendliness of the device and the external device.

In accordance with a sixth aspect of the present invention, the electric device according to the fifth aspect further comprises an additional power supply electrically connected to the wireless communicator to supply electricity to the wireless communicator.

With the device according to the sixth aspect, it is possible to supply electricity to the wireless communicator from the additional power supply. Thus, it is possible to use the device without an electric cable, improving user-friendliness of the device and the external device.

In accordance with a seventh aspect of the present invention, the electric device according to any one of the first to sixth aspects further comprises a memory electrically connected to the communication electrical contact. The memory is configured to store information received from the external device.

With the device according to the seventh aspect, it is possible to store, in the memory, the information received from the external device. Thus, it is possible to utilize the information stored in the memory in a state where the device is not connected to the external device.

In accordance with an eighth aspect of the present invention, the electric device according to any one of the first to seventh aspects is configured so that the communication electrical contact includes a first communication electrical contact and a second communication electrical contact. The first communication electrical contact is contactable with a first electrical contact of the electrical contact. The second communication electrical contact is contactable with the second electrical contact of the electrical contact.

With the device according to the eighth aspect, it is possible to adapt the device for the first electrical contact and the second electrical contact of the electric device using the first communication electrical contact and a second communication electrical contact.

In accordance with a ninth aspect of the present invention, the electric device according to the eighth aspect is configured so that the first communication electrical contact is spaced apart from the second communication electrical contact.

With the device according to the ninth aspect, it is possible to reliably adapt the device for the first electrical contact and the second electrical contact of the electric device using the first communication electrical contact and a second communication electrical contact.

In accordance with a tenth aspect of the present invention, the electric device according to the ninth aspect is configured so that the first communication electrical contact is spaced apart from the second communication electrical contact to define a recess between the first communication electrical contact and the second communication electrical contact.

With the device according to the tenth aspect, the recess can reduce interference between the device and the electric device.

In accordance with an eleventh aspect of the present invention, the electric device according to any one of the first to tenth aspects is configured so that the electrical contact is configured to receive electricity and the information from the external device via the communication electrical contact in the second state of the electrical contact.

With the device according to the eleventh aspect, the electrical contact can receive the information using electricity.

In accordance with a twelfth aspect of the present invention, the electric device according to any one of the first to eleventh aspects is configured so that the communication electrical contact is configured to be at least partially provided in a space defined by the electrical contact of the electric device in the second state of the electrical contact.

With the device according to the twelfth aspect, it is possible to utilize the space defined by the electrical contact as a space in which the communication electrical contact is at least partially provided in the second state of the electrical contact.

In accordance with a thirteenth aspect of the present invention, the electric device according to any one of the first to twelfth aspects further comprises a base. The communication electrical contact is attached to the base.

With the device according to the thirteenth aspect, the base can maintain the posture of the communication electrical contact. This improves user-friendliness of the device.

In accordance with a fourteenth aspect of the present invention, the electric device according to the thirteenth aspect is configured so that the base is configured to be at least partially provided in a space defined by the electrical contact of the electric device in the second state of the electrical contact.

With the device according to the fourteenth aspect, it is possible to utilize the space defined by the electrical contact as a space in which the base is at least partially provided in the second state of the electrical contact.

In accordance with a fifteenth aspect of the present invention, the electric device according to the thirteenth or fourteenth aspect is configured so that the base includes a base body and a protruding body protruding from the base body. The protruding body is configured to be at least partially provided in a space defined by the electrical contact of the electric device in the second state of the electrical contact.

With the device according to the fifteenth aspect, it is possible to utilize the space defined by the electrical contact as a space in which the protruding body is at least partially provided in the second state of the electrical contact.

In accordance with a sixteenth aspect of the present invention, the electric device according to the fifteenth aspect is configured so that the communication electrical contact is at least partially provided to the protruding body.

With the device according to the sixteenth aspect, it is possible to reliably bring the communication electrical contact into contact with the electrical contact in the second state.

In accordance with a seventeenth aspect of the present invention, the electric device according to the fifteenth or sixteenth aspect is configured so that the protruding body includes a first protruding part and a second protruding part. The first protruding part protrudes from the base body. The first protruding part is at least partially provided in the space in the second state of the electrical contact. The second protruding part protrudes from the base body and is spaced apart from the first protruding part. The second protruding part is at least partially provided in the space in the second state of the electrical contact.

With the device according to the seventeenth aspect, in a case where the communication electrical contact includes a plurality of communication electrical contacts, it is possible to hold the plurality of communication electrical contacts using the first protruding part and the second protruding part.

In accordance with am eighteenth aspect of the present invention, the electric device according to any one of the fifteenth to seventeenth aspects is configured so that the protruding body includes an outer peripheral surface configured to be at least partially provided in the space in the second state of the electrical contact.

With the device according to the eighteenth aspect, it is possible to reduce a volume of the protruding body while maintaining an enough outer area of the protruding body. Thus, it is possible to avoid an increase in the volume of the device.

In accordance with a nineteenth aspect of the present invention, the electric device according to any one of the first to eighteenth aspects is configured so that the communication electrical contact is configured to receive a voltage different from a power-supply voltage of the power supply.

With the device according to the nineteenth aspect, it is possible to determine whether the electrical contact is in the first state or the second state using the voltage used by the communication electrical contact and the power-supply voltage of the power supply.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
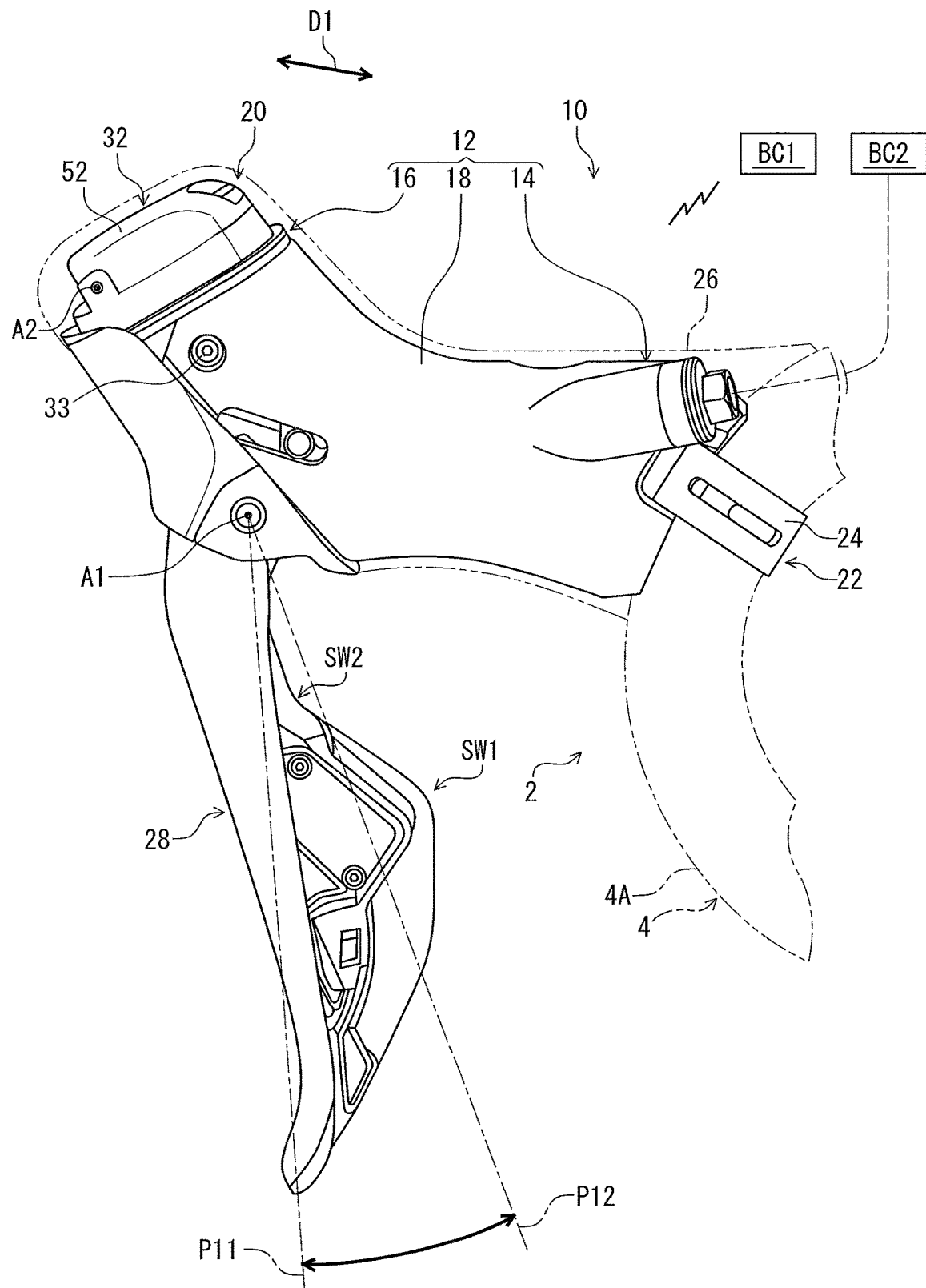
FIG. 1 is a side elevational view of an operating device including an electric device in accordance with a first embodiment.

The embodiment(s) will now be described with reference to the accompanying drawings, wherein like reference numerals designate corresponding or identical elements throughout the various drawings.

First Embodiment

As seen in FIG. 1, an operating device 10 for a human-powered vehicle 2 is configured to operate at least one component. The operating device 10 is configured to be mounted to a vehicle body 4. The operating device 10 is configured to be mounted to a tubular part 4A of the vehicle body 4. Examples of the tubular part 4A of the vehicle body 4 include a handlebar. However, the vehicle body 4 is not limited to the tubular part 4A. The operating device 10 can be mounted to other parts of the human-powered vehicle 2 if needed and/or desired.

In the present application, a human-powered vehicle is a vehicle to travel with a motive power including at least a human power of a user who rides the human-powered vehicle (i.e., rider). The human-powered vehicle includes a various kind of bicycles such as a mountain bike, a road bike, a city bike, a cargo bike, a hand bike, and a recumbent bike. Furthermore, the human-powered vehicle includes an electric bike (E-bike). The electric bike includes an electrically assisted bicycle configured to assist propulsion of a vehicle with an electric motor. However, a total number of wheels of the human-powered vehicle is not limited to two. For example, the human-powered vehicle includes a vehicle having one wheel or three or more wheels. Especially, the human-powered vehicle does not include a vehicle that uses only an internal-combustion engine as motive power. Generally, a light road vehicle, which includes a vehicle that does not require a driver's license for a public road, is assumed as the human-powered vehicle.

The operating device 10 is configured to be electrically connected to an electric component BC1. In the first embodiment, the operating device 10 is configured to be connected to the electric component BC1 via a wireless communication channel. The operating device 10 is configured to be wirelessly connected to the electric component BC1. However, the operating device 10 can be configured to be connected to the electric component BC1 via a wired communication channel if needed and/or desired.

Examples of the electric component BC1 include an additional or satellite operating device, an adjustable seatpost, a suspension, a gear changing device, a brake device, a lighting device, a display device, and a cycle computer. In the first embodiment, the electric component BC1 includes a gear changing device such as a derailleur. However, the electric component BC1 is not limited to the above devices.

The operating device 10 is configured to be connected to an additional component BC2. In the first embodiment, the operating device 10 is configured to be connected to the additional component BC2 via a hydraulic hose. However, the operating device 10 can be configured to be connected to the additional component BC2 via other elements such as a mechanical cable (e.g., Bowden cable).

Examples of the additional component BC2 include an adjustable seatpost, a suspension, a gear changing device, and a brake device. In the first embodiment, the additional component BC2 includes a hydraulic brake device. However, the additional component BC2 is not limited to the above devices.

In the first embodiment, the operating device 10 is a right-hand side operating device configured to be operated by the rider's right hand to actuate the electric component BC1 and the additional component BC2. However, the structures of the operating device 10 can be applied to a left-hand side operating device.

In the present application, the following directional terms "front," "rear," "forward," "rearward," "left," "right," "transverse," "upward" and "downward" as well as any other similar directional terms refer to those directions which are determined on the basis of a user (e.g., a rider) who is in the user's standard position (e.g., on a saddle or a seat) in the human-powered vehicle 2 with facing a steering or a handlebar. Accordingly, these terms, as utilized to describe the operating device 10 or other components, should be interpreted relative to the human-powered vehicle 2 equipped with the operating device 10 as used in an upright riding position on a horizontal surface.

The operating device 10 for the human-powered vehicle 2 comprises a base structure 12. The base structure 12 is configured to be coupled to the vehicle body 4. In the first embodiment, the base structure 12 is configured to be mounted to a drop-down handlebar. However, structures of the operating device 10 can be applied to other operating devices mounted to other type of handlebars such as a flat handlebar, a time trial handlebar, and a bull horn handlebar.

The base structure 12 extends in a longitudinal direction D1. The base structure 12 includes a first end portion 14 and a second end portion 16. The first end portion 14 is configured to be coupled to the vehicle body 4. The second end portion 16 is opposite to the first end portion 14 in the longitudinal direction D1. The base structure 12 includes a grip portion 18. The grip portion 18 is provided between the first end portion 14 and the second end portion 16 in the longitudinal direction D1. The second end portion 16 includes a pommel portion 20.

The operating device 10 further comprises a mounting structure 22 configured to couple the first end portion 14 to the vehicle body 4. The mounting structure 22 includes a band clamp 24. However, the mounting structure 22 can include other structures which is similar to the band clamp 24 and which is used in a road shifter for mounting to the drop-down handlebar.

The operating device 10 comprises a cover 26. The cover 26 is configured to be detachably and reattachably attached to the base structure 12 to at least partially cover the base structure 12. The cover 26 is made of an elastic material such as rubber. A rider sometimes grips the base structure 12 (e.g., the grip portion 18) and leans on the base structure 12 (e.g., the grip portion 18) through the cover 26 during riding. The cover 26 can be omitted from the operating device 10 if needed and/or desired.

The term "detachably and reattachably" as used herein, encompasses a configuration in which an element is repeatedly detachable from and attachable to another element without substantial damage.

The operating device 10 for the human-powered vehicle 2 comprises an operating member 28. The operating member 28 is movably coupled to the base structure 12. The operating member 28 is pivotally coupled to the base structure 12 about a pivot axis A1. The operating member 28 is pivotable relative to the base structure 12 between a rest position P11 and an operated position P12 about the pivot axis A1.

In the present application, the term "rest position" as used herein refers to a position at which a movable part such as the operating member 28 remains stationary in a state where the movable part is not operated by the user. The term "operated position" as used herein refers to a position at which the movable part has been operated by the user to perform the operation of a device such as the additional component BC2.

The operating device 10 comprises at least one switch. The operating device 10 comprises a plurality of switches SW1 and SW2. Examples of the switches SW1 and SW2 include a normally open switch. For example, each of the switches SW1 and SW2 includes a switch circuit and a button. The switches SW1 and SW2 are mounted to the operating member 28 to be movable relative to the base structure 12 along with the operating member 28. However, at least one of the switches SW1 and SW2 can be provided in other positions such as the base structure 12. At least one of the switches SW1 and SW2 can be omitted from the operating device 10 if needed and/or desired.

Figure 2:
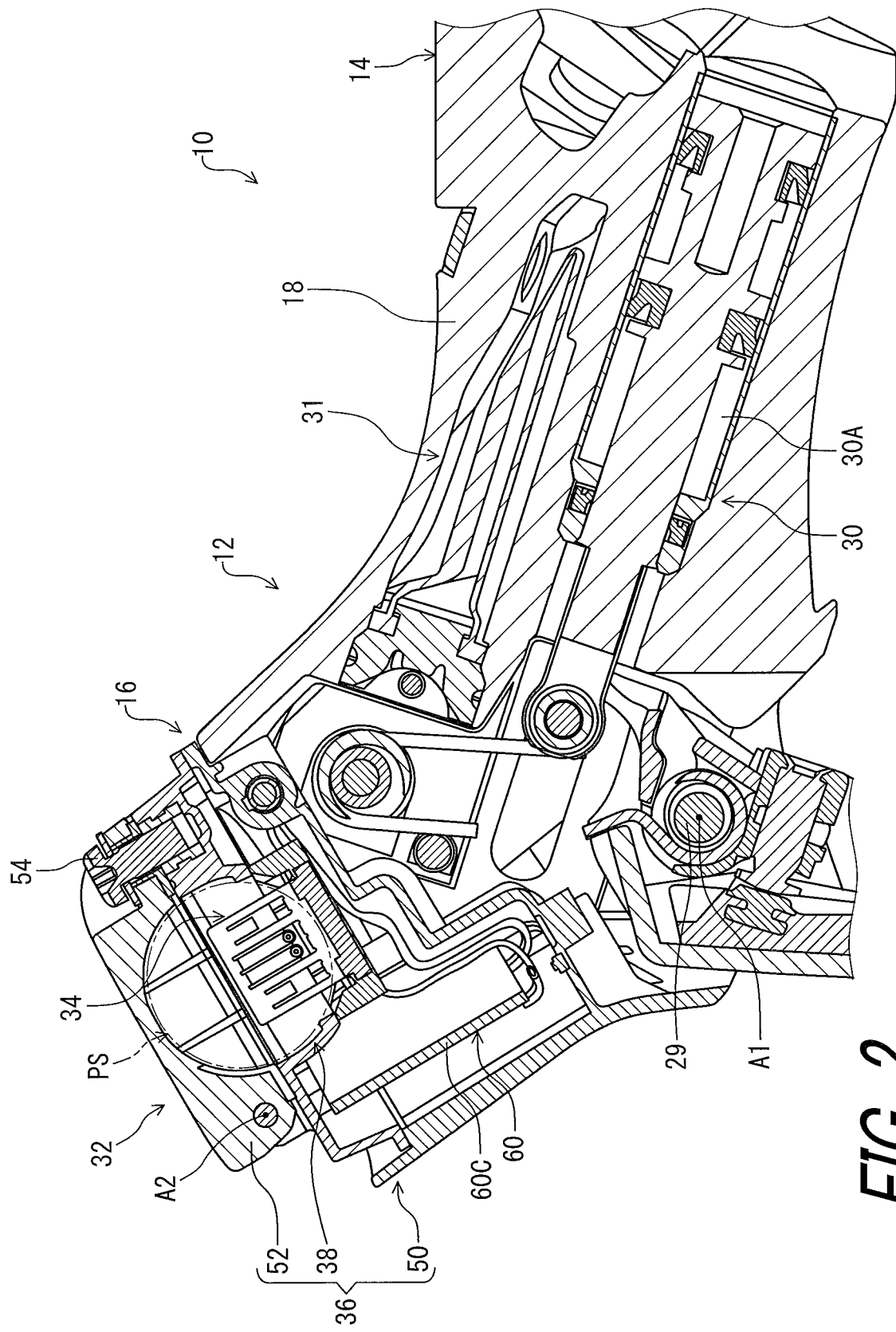
FIG. 2 is a cross-sectional view of the operating device illustrated in FIG. 1.

As seen in FIG. 2, the operating device 10 for the human-powered vehicle 2 comprises a hydraulic unit 30 and a reservoir 31. The hydraulic unit 30 is configured to generate a hydraulic pressure in response to the movement of the operating member 28. The hydraulic unit 30 includes a hydraulic chamber 30A filled with a fluid. The reservoir 31 is connected to the hydraulic unit 30 to absorb a change in a volume of the fluid provided in the hydraulic chamber. The hydraulic unit 30 is configured to be connected to the additional component BC2 (see e.g., FIG. 1) via the hydraulic hose. The structure of the hydraulic unit 30 and the reservoir 31 have been known in the human-powered vehicle field. Thus, they will not be described in detail here for the sake of brevity. The operating device 10 can include other structures configured to operate the additional component BC2 if needed and/or desired. For example, the operating device 10 can include an operating unit configured to wind or unwind a mechanical cable (e.g., a Bowden cable) to operate the additional component CB2 if needed and/or desired.

As seen in FIG. 2, the operating device 10 for the human-powered vehicle 2 comprises an electric device 32. The electric device 32 is coupled to the base structure 12. The electric device 32 is coupled to the second end portion 16 of the base structure 12. The electric device 32 is coupled to the pommel portion 20 of the base structure 12. However, the electric device 32 can be provided to portions other than the pommel portion 20 if needed and/or desired. The electric device 32 can be coupled to portions other than the second end portion 16 if needed and/or desired. The electric device 32 can be provided to members other than the base structure 12 of the operating device 10.

Figure 3:
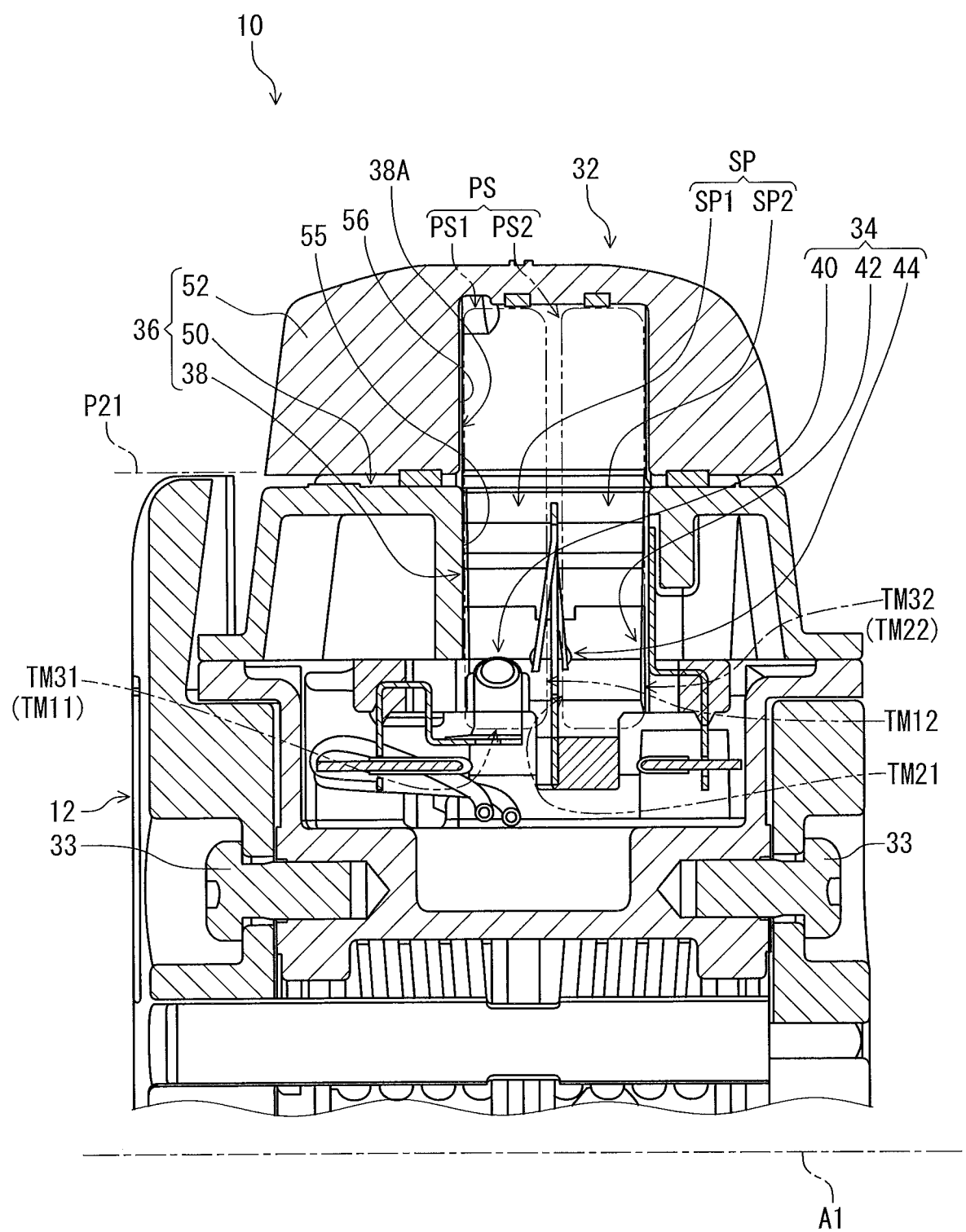
FIG. 3 is a cross-sectional view of the operating device taken along line III-III of FIG. 10.

As seen in FIG. 3, the electric device 32 is coupled to the base structure 12. In the first embodiment, the electric device 32 is secured to the base structure 12 with fasteners 33 such as screws. However, the electric device 32 can be secured to the base structure 12 with other structures such as an adhesive agent, insertion molding, and press-fitting if needed and/or desired.

The electric device 32 for the human-powered vehicle 2 comprises an electrical contact 34. The electric device 32 further comprises a base member 36. The base member 36 includes a power-supply accommodating part 38. The electrical contact 34 is provided to the power-supply accommodating part 38. The base member 36 is coupled to the base structure 12. The base member 36 is secured to the base structure 12 with the fasteners 33.

As seen in FIG. 2, the operating member 28 is movably coupled to the base member 36 of the electric device 32 since the base member 36 is coupled to the base structure 12. The operating member 28 is pivotally couped to the base member 36 about the pivot axis A1.

As seen in FIG. 3, the electrical contact 34 has a first state where the electrical contact 34 receives electricity from a power supply PS. The electrical contact 34 is configured to receive electricity from the power supply PS. The power-supply accommodating part 38 is configured to at least partially accommodate the power supply PS in the first state. The power-supply accommodating part 38 includes a power-supply accommodating space 38A in which the power supply PS is at least partially provided. The electrical contact 34 is at least partially provided in the power-supply accommodating space 38A.

In the first embodiment, the power-supply accommodating part 38 is configured to entirely accommodate the power supply PS in the first state. The power supply PS is entirely provided in the power-supply accommodating space 38A in the first state. The electrical contact 34 is entirely provided in the power-supply accommodating space 38A. However, the power-supply accommodating part 38 can be configured to partially accommodate the power supply PS in the first state if needed and/or desired. The power supply PS can be entirely provided in the power-supply accommodating space 38A in the first state if needed and/or desired. The electrical contact 34 can be partially provided in the power-supply accommodating space 38A if needed and/or desired.

Figure 6:
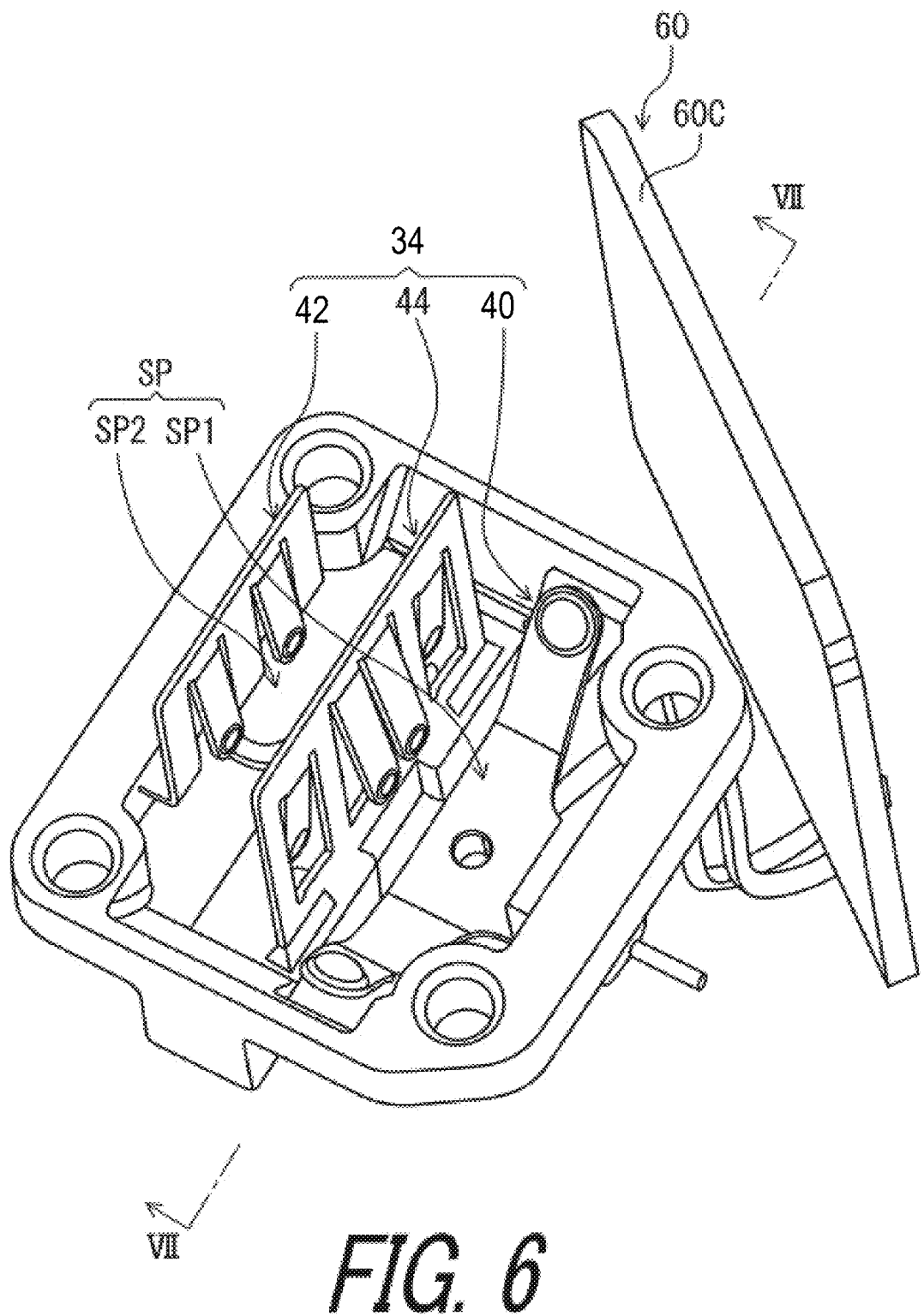
FIG. 6 is a perspective view of an electrical contact of the electric device of the operating device illustrated in FIG. 1.

As seen in FIG. 6, the electrical contact 34 includes a first electrical contact 40 and a second electrical contact 42 spaced apart from the first electrical contact 40. In the present embodiment, the electrical contact 34 includes a third electrical contact 44 spaced apart from the first electrical contact 40 and the second electrical contact 42. However, the third electrical contact 44 can be omitted from the electrical contact 34 if needed and/or desired.

As seen in FIG. 3, in the first embodiment, the third electrical contact 44 is disposed between the first electrical contact 40 and the second electrical contact 42. However, the third electrical contact 44 can be disposed in positions other than the position provided between the first electrical contact 40 and the second electrical contact 42 if needed and/or desired.

The first electrical contact 40 and the second electrical contact 42 are in contact with the power supply PS in the first state. The first electrical contact 40, the second electrical contact 42, and the third electrical contact 44 are in contact with the power supply PS in the first state.

The power supply PS includes a first battery PS1 and a second battery PS2 which is a separate battery from the first battery PS1. Examples of the first battery and the second battery include a primary battery and a secondary battery. The first electrical contact 40 and the third electrical contact 44 are in contact with the first battery PS1 in the first state. The second electrical contact 42 and the third electrical contact 44 are in contact with the second battery PS2 in the first state. Thus, the first battery PS1 and the second battery PS2 are connected in series. However, the first battery PS1 and the second battery PS2 can be connected in parallel if needed and/or desired. The power supply PS is not limited to the first battery PS1 and the second battery PS2. The power supply PS can include only one of the first battery PS1 and the second battery PS2 if needed and/or desired. In such modifications, the third electrical contact 44 can be omitted from the electrical contact 34.

In the first embodiment, the first battery PS1 includes a first coin battery. The second battery PS2 includes a second coin battery. The first electrical contact 40 and the third electrical contact 44 are in contact with the first coin battery in the first state. The second electrical contact 42 and the third electrical contact 44 are in contact with the second coin battery in the first state. However, the first battery PS1 can include a battery other than a coin battery if needed and/or desired. The second battery PS2 can include a battery other than a coin battery if needed and/or desired.

Figure 4:
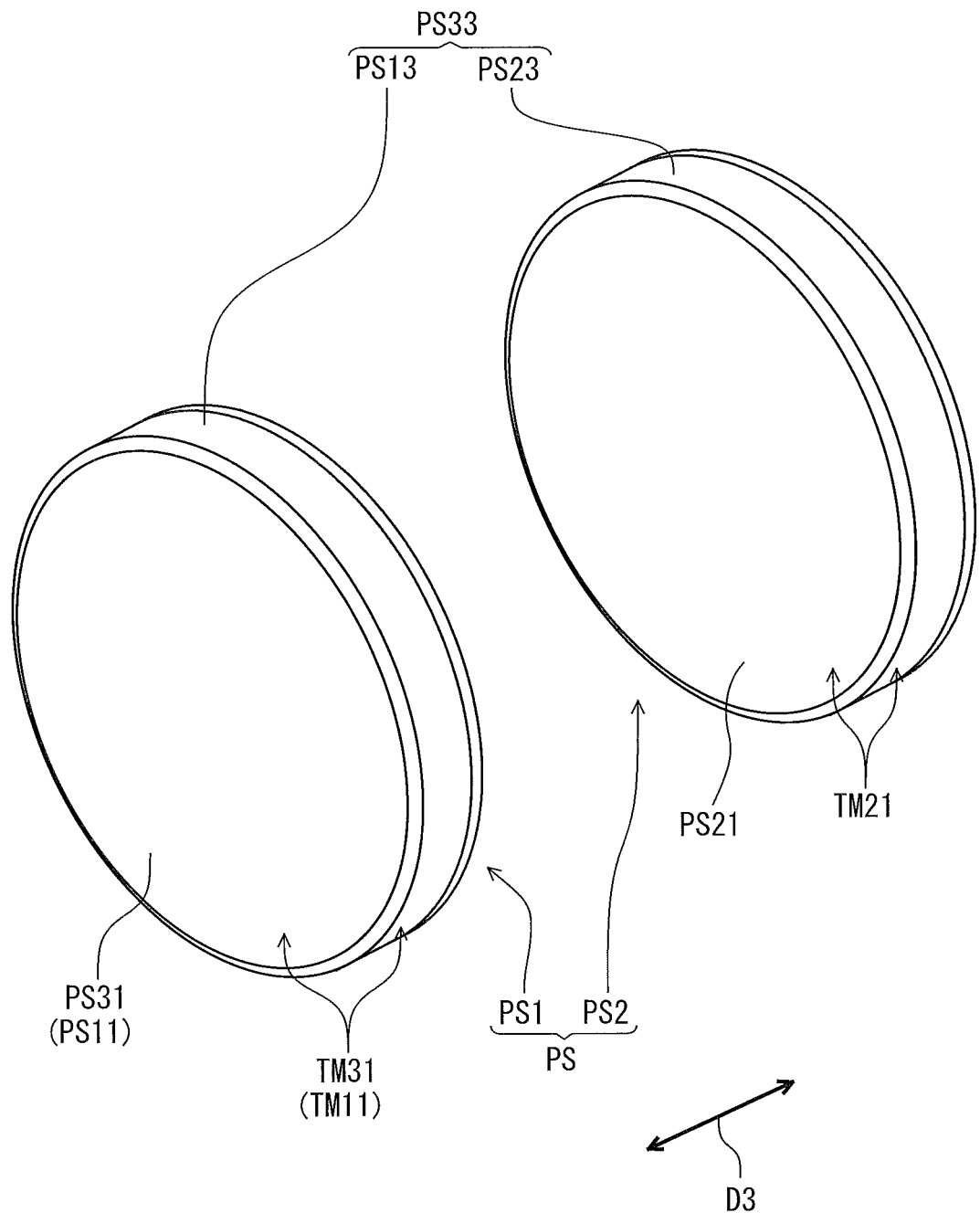
FIG. 4 is a perspective view of a power supply illustrated in FIG. 3.
Figure 5:
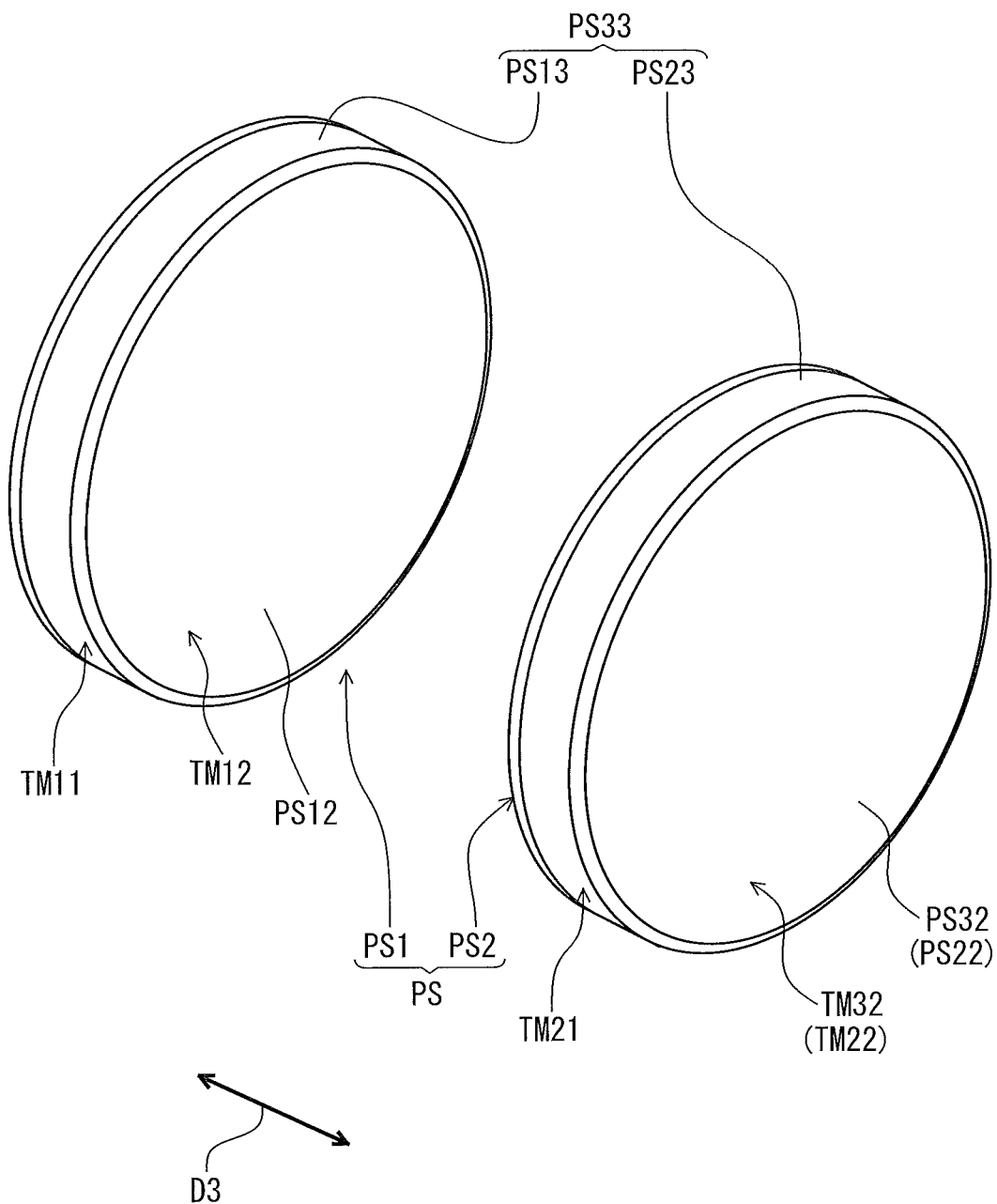
FIG. 5 is another perspective view of the power supply illustrated in FIG. 3.

As seen in FIGS. 4 and 5, the power supply PS includes an end surface PS31, an additional end surface PS32, and an outer peripheral surface PS33. The end surface PS31 has a round shape. The additional end surface PS32 has a round shape. The end surface PS31 faces in a thickness direction D3. The additional end surface PS32 faces in the thickness direction D3. The additional end surface PS32 is provided on a reverse side of the end surface PS31 in the thickness direction D3.

The power supply PS includes a positive terminal TM31 and a negative terminal TM32. The positive terminal TM31 is provided on the end surface PS31 and the outer peripheral surface PS33. The negative terminal TM32 is provided on the additional end surface PS32. However, the shape of the power supply PS is not limited to the above shape.

The first battery PS1 includes a first end surface PS11, a first additional end surface PS12, and a first outer peripheral surface PS13. The first end surface PS11 has a round shape. The first additional end surface PS12 has a round shape. The first end surface PS11 faces in the thickness direction D3. The first additional end surface PS12 faces in the thickness direction D3. The first additional end surface PS12 is provided on a reverse side of the first end surface PS11 in the thickness direction D3.

The first battery PS1 includes a first positive terminal TM11 and a first negative terminal TM12. The first positive terminal TM11 is provided on the first end surface PS11 and the first outer peripheral surface PS13. The first negative terminal TM12 is provided on the first additional end surface PS12.

The second battery PS2 includes a second end surface PS21, a second additional end surface PS22, and a second outer peripheral surface PS23. The second end surface PS21 has a round shape. The second additional end surface PS22 has a round shape. The second end surface PS21 faces in the thickness direction D3. The second additional end surface PS22 faces in the thickness direction D3. The second additional end surface PS22 is provided on a reverse side of the second end surface PS21 in the thickness direction D3.

The second battery PS2 includes a second positive terminal TM21 and a second negative terminal TM22. The second positive terminal TM21 is provided on the second end surface PS21 and the second outer peripheral surface PS23. The second negative terminal TM22 is provided on the second additional end surface PS22.

In the present embodiment, the end surface PS31 of the power supply PS includes the first end surface PS11 of the first battery PS1. The additional end surface PS32 of the power supply PS includes the second additional end surface PS22 of the second battery PS2. The outer peripheral surface PS33 of the power supply PS includes the first outer peripheral surface PS13 of the first battery PS1 and the second outer peripheral surface PS23 of the second battery PS2. However, the relationships among the end surface PS31, the additional end surface PS32, the outer peripheral surface PS33, the first end surface PS11, the first additional end surface PS12, the first outer peripheral surface PS13, the second end surface PS21, the second additional end surface PS22, and the second outer peripheral surface PS23 are not limited to the above relationships.

As seen in FIG. 3, the first electrical contact 40 is in contact with the positive terminal TM31 of the power supply PS in the first state. The second electrical contact 42 is in contact with the negative terminal TM32 of the power supply PS in the first state. Specifically, the first electrical contact 40 is in contact with the first positive terminal TM11 of the first power supply PS1 in the first state. The second electrical contact 42 is in contact with the second positive terminal TM22 of the second power supply PS2 in the second state. The third electrical contact 44 is in contact with the first negative terminal TM12 of the first power supply PS1 in the first state. The third electrical contact 44 is in contact with the second positive terminal TM21 of the second power supply PS2 in the first state. However, the positional relationship between the first power supply PS1, the second power supply PS2, the first electrical contact 40, the second electrical contact 42, and the third electrical contact 44 is not limited to the illustrated embodiment.

As seen in FIG. 3, the electrical contact 34 defines a space SP. The space SP is configured to at least partially accommodate the power supply PS in the first state. The power-supply accommodating space 38A includes the space SP. The space SP is a part of the power-supply accommodating space 38A. In the first embodiment, the space SP is configured to partially accommodate the power supply PS in the first state. However, the space SP can be configured to entirely accommodate the power supply PS in the first state if needed and/or desired. The space SP can be entirely of the power-supply accommodating space 38A if needed and/or desired.

The space SP includes a first space SP1 and a second space SP2. The first space SP1 is defined by the first electrical contact 40 and the third electrical contact 44. The second space SP2 is defined by the second electrical contact 42 and the third electrical contact 44.

The first battery PS1 is at least partially provided in the first space SP1 in the first state. The second battery PS2 is at least partially provided in the second space SP2 in the first state. In the first embodiment, the first battery PS1 is partially provided in the first space SP1 in the first state. The second battery PS2 is partially provided in the second space SP2 in the first state. However, the first battery PS1 can be entirely provided in the first space SP1 in the first state if needed and/or desired. The second battery PS2 can be entirely provided in the second space SP2 in the first state if needed and/or desired.

Figure 7:
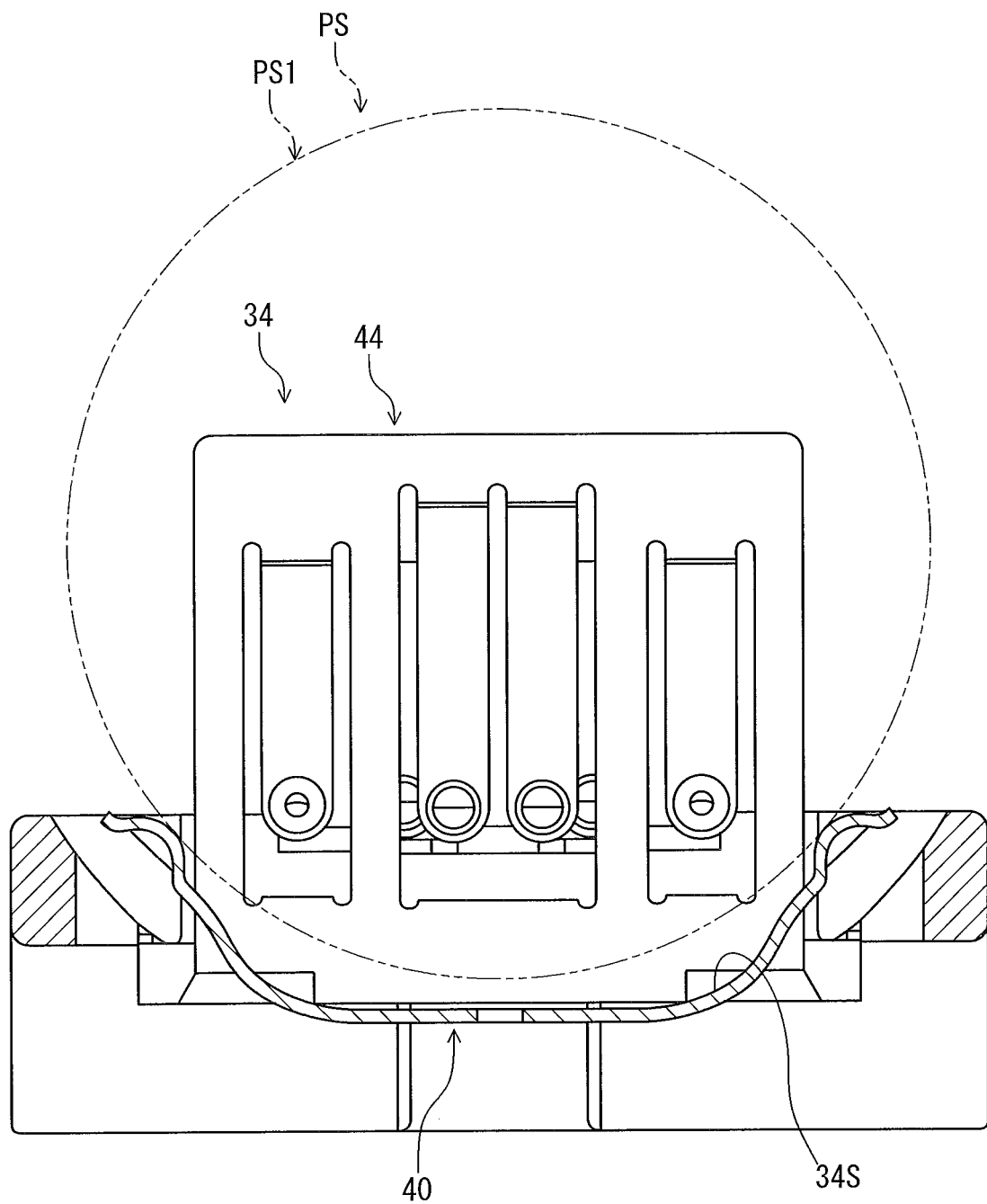
FIG. 7 is a cross-sectional view of the electrical contact of the electric device take along line VII-VII of FIG. 6.

As seen in FIG. 7, the electrical contact 34 has a curved surface 34S extending along an outer periphery of the power supply PS. The first electrical contact 40 has the curved surface 34S extending along the outer periphery of the power supply PS. The curved surface 34S extends along an outer periphery of the first battery PS1. The first electrical contact 40 is contactable with the outer periphery of the first battery PS1. The curved surface 34S can be omitted from the first electrical contact 40 of the electrical contact 34 if needed and/or desired.

Figure 8:
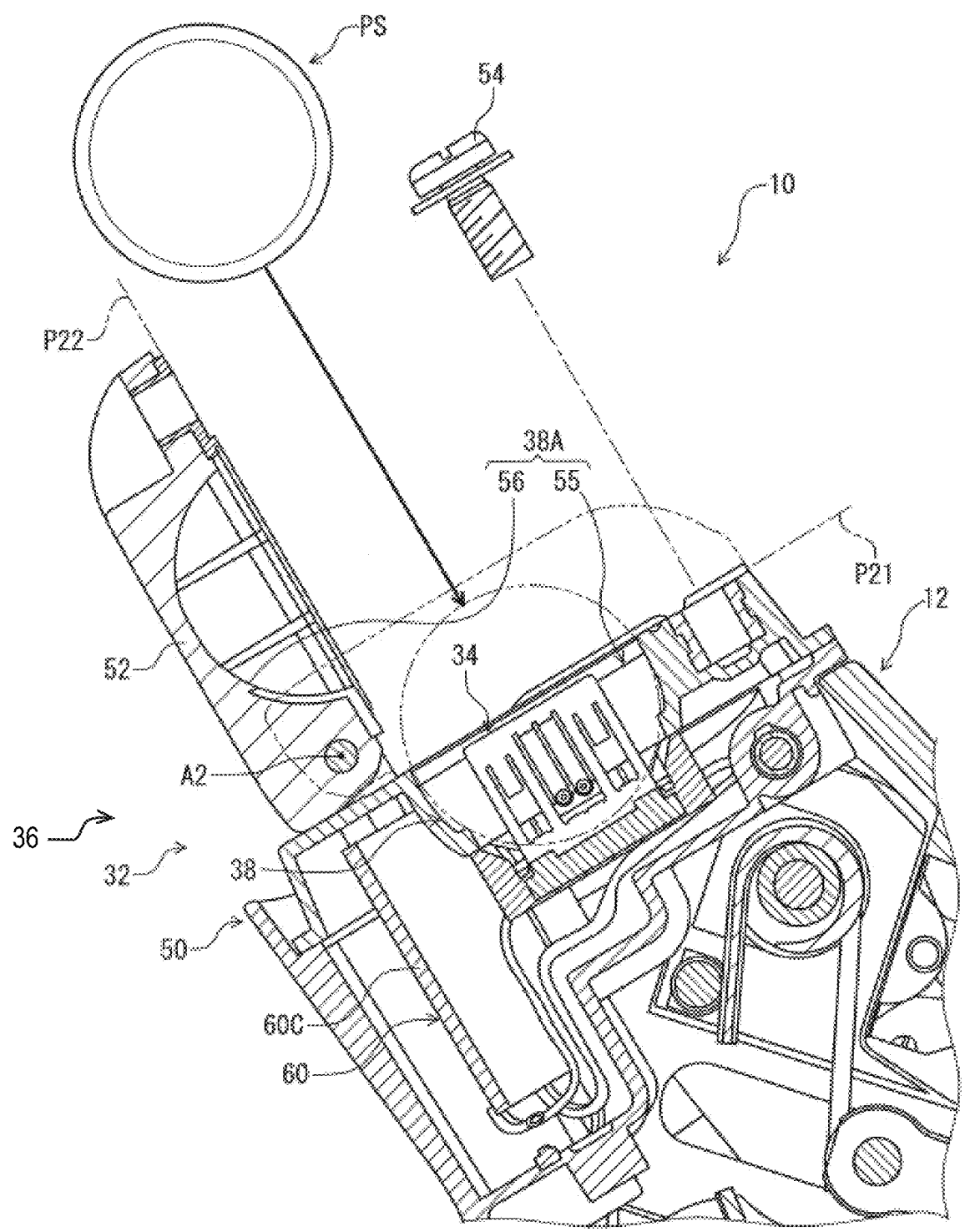
FIG. 8 is a partial cross-sectional view of the operating device illustrated in FIG. 1 (open position).

As seen in FIG. 8, the base member 36 includes a base part 50 and a lid 52. The lid 52 is pivotally coupled to the base part 50 about a lid pivot axis A2. The lid 52 is pivotable relative to the base part 50 about the lid pivot axis A2 between a closed position P21 and an open position P22. However, the lid 52 can be coupled to the base part 50 with structures other than the pivotal structure if needed and/or desired. The lid 52 covers the power-supply accommodating space 38A in a closed state where the lid 52 is in the closed position P21. The power-supply accommodating space 38A is open to allow the power supply PS to be inserted into the power-supply accommodating space 38A and to be removed from the power-supply accommodating space 38A in an open state where the lid 52 is in the open position P22. The base member 36 includes a lid fastener 54. The lid fastener 54 is configured to secure the lid 52 to the base part 50. The base member 36 includes a pivot pin 114P.

The base part 50 includes a first recess 55 in which the power supply PS is to be partially provided in the first state. The power-supply accommodating space 38A includes at least part of the first recess 55. The electrical contact 34 is provided in the first recess 55.

The lid 52 includes a second recess 56 in which the power supply PS is to be partially provided in the closed state where the lid 52 is in the closed position P21. The power-supply accommodating space 38A includes at least part of the second recess 56. However, the second recess 56 can be omitted from the lid 52 if needed and/or desired.

Figure 9:
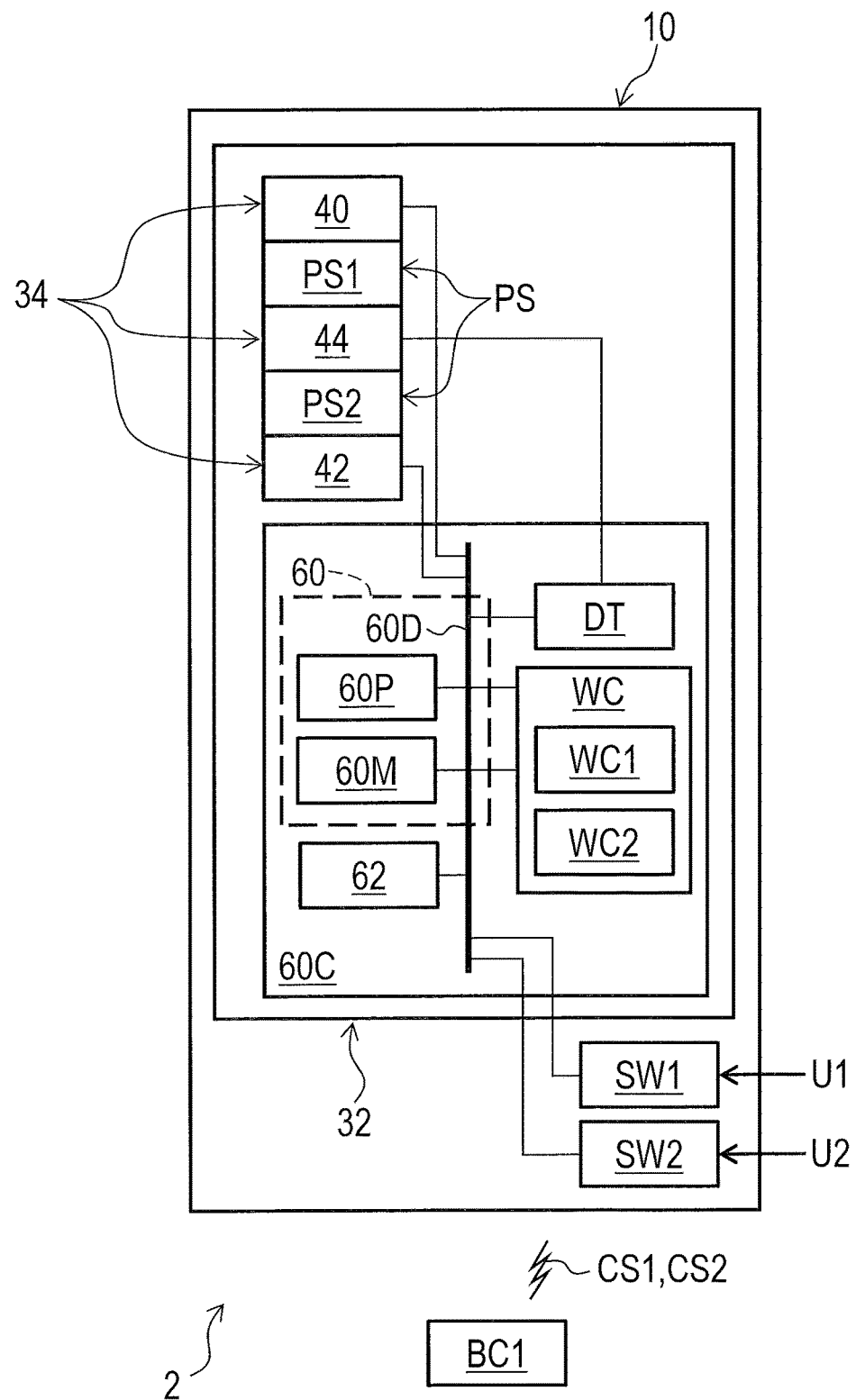
FIG. 9 is a schematic block diagram of a human-powered vehicle including the operating device illustrated in FIG. 1 (first state).

As seen in FIG. 9, the switch SW1 is configured to receive a user input U1. The switch SW2 is configured to receive a user input U2. The switch SW1 is configured to be activated in response to the user input U1. The switch SW2 is configured to be activated in response to the user input U2.

The electric device 32 comprises a controller 60. The controller 60 is electrically connected to the switches SW1 and SW2. The controller 60 is configured to control another device (e.g., the electric component BC1) in response to at least one of the activation of the switch SW1, the activation of the switch SW2, and other information.

The controller 60 is electrically connected to the electrical contact 34. The controller 60 is electrically connected to the first electrical contact 40 and the second electrical contact 42. The controller 60 is configured to be powered by the power supply PS in the first state. The controller 60 is configured to be powered by the first battery PS1 and the second battery PS2 in the first state. The power supply PS is configured to supply electricity to the controller 60 via the electrical contact 34. The first battery PS1 and the second battery PS2 are configured to supply electricity to the controller 60 via the first electrical contact 40, the second electrical contact 42, and the third electrical contact 44.

The controller 60 includes a processor 60P, a memory 60M, a circuit board 60C, and a bus 60D. The processor 60P and the memory 60M are electrically mounted on the circuit board 60C. The processor 60P and the memory 60M are electrically connected to the circuit board 60C via the bus 60D. The processor 60P is electrically connected to the memory 60M via the circuit board 60C and the bus 60D.

For example, the processor 60P includes at least one of a central processing unit (CPU), a micro processing unit (MPU), and a memory controller. The memory 60M is electrically connected to the processor 60P. For example, the memory 60M includes at least one of a volatile memory and a non-volatile memory. Examples of the volatile memory include a random-access memory (RAM) and a dynamic random-access memory (DRAM). Examples of the non-volatile memory include a read only memory (ROM) and an electrically erasable programmable ROM. The memory 60M includes storage areas each having an address in the ROM and the RAM. The processor 60P is configured to control the memory 60M to store data in the storage areas of the memory 60M and reads data from the storage areas of the memory 60M. The processor 60P can also be referred to as a hardware processor 60P. The memory 60M can also be referred to as a hardware memory 60M. The memory 60M can also be referred to as a computer-readable storage medium 60M.

The controller 60 is programed to execute at least one control algorithm of the electric device 32. The memory 60M (e.g., the ROM) stores at least one program including at least one program instructions. The at least one program is read into the processor 60P, and thereby the at least one control algorithm of the electric device 32 is executed based on the at least one program. The controller 60 can also be referred to as a control circuit or circuitry 60. The controller 60 can also be referred to as a hardware controller 60.

The structure of the controller 60 is not limited to the above structure. The structure of the controller 60 is not limited to the processor 60P, the memory 60M, the circuit board 60C, and the bus 60D. The controller 60 can be realized by hardware alone or a combination of hardware and software. The processor 60P and the memory 60M can be integrated as a one chip such as an application specific integrated circuit (ASIC) or a field programmable gate array (FPGA).

The electric device 32 further comprises a communicator WC. The communicator WC is electrically connected to the electrical contact 34. The communicator WC is electrically connected to the first electrical contact 40 and the second electrical contact 42. The communicator WC is configured to be powered by the power supply PS in the first state. The communicator WC is configured to be powered by the first battery PS1 and the second battery PS2 in the first state. The power supply PS is configured to supply electricity to the communicator WC via the electrical contact 34. The first battery PS1 and the second battery PS2 are configured to supply electricity to the communicator WC via the first electrical contact 40, the second electrical contact 42, and the third electrical contact 44.

The communicator WC is configured to communicate with other components such as the electric component BC1. The controller 60 is electrically connected to the communicator WC to control the communicator WC in response to the activation of at least one of the switches SW1 and SW2. The controller 60 is configured to generate a control signal CS1 in response to the activation of the switch SW1. The controller 60 is configured to generate a control signal CS2 in response to the activation of the switch SW2. The controller 60 is configured to control the communicator WC to transmit the control signal CS1 in response to the activation of the switch SW1. The controller 60 is configured to control the communicator WC to transmit the control signal CS2 in response to the activation of the switch SW2.

The communicator WC includes a wireless communicator WC1. The wireless communicator WC1 is electrically connected to the controller 60. The wireless communicator WC1 is electrically connected to the processor 60P and the memory 60M with the circuit board 60C and the bus 60D. The wireless communicator WC1 includes a signal transmitting circuit or circuitry, a signal receiving circuit or circuitry, and an antenna. Thus, the wireless communicator WC1 can also be referred to as a wireless communicator circuit or circuitry WC1.

The wireless communicator WC1 is configured to superimpose signals on carrier wave using a predetermined wireless communication protocol to wirelessly transmit the signals. In the first embodiment, the wireless communicator WC1 is configured to encrypt signals using a cryptographic key to generate encrypted wireless signals. The wireless communicator WC1 is configured to transmit wireless signals via the antenna.

The wireless communicator WC1 is configured to receive wireless signals via the antenna. In the first embodiment, the wireless communicator WC1 is configured to decode the wireless signals to recognize signals transmitted from other wireless communicators. The wireless communicator WC1 is configured to decrypt the wireless signals using the cryptographic key.

Examples of the communication protocol of the wireless communicator WC1 include Wi-Fi®, Zigbee®, Bluetooth®, ANT®, and other wireless communication protocols.

The controller 60 is electrically connected to the wireless communicator WC1 to control the wireless communicator WC1 in response to the activation of at least one of the switches SW1 and SW2. The controller 60 is configured to control the wireless communicator WC1 to wirelessly transmit the control signal CS1 in response to the activation of the switch SW1. The controller 60 is configured to control the wireless communicator WC1 to wirelessly transmit the control signal CS2 in response to the activation of the switch SW2.

In the first embodiment, the communicator WC is configured to communicate with an additional communicator of an additional component via a wired communication structure WS including an electric cable WS1 using power line communication (PLC) technology. More specifically, the wired communication structure WS includes a ground line and a voltage line that are detachably connected to a serial bus that is formed by communication interfaces. In the first embodiment, the communicator WC is configured to communicate with the additional electric component through the voltage line using the PLC technology. Since the PLC technology has been known, it will not be described in detail here for the sake of brevity. The communicator WC can be configured to communicate with an additional communicator using methods other than the PLC if needed and/or desired.

The communicator WC includes a wired communicator WC2. The wired communicator WC2 is configured to separate an input signal from a power source voltage supplied to the electric device 32. The wired communicator WC2 is configured to superimpose an output signal on the power source voltage supplied to the electric device 32. The wired communicator WC2 can also be referred to as a wired communicator circuit or circuitry WC2.

The electric device 32 comprises an informing unit 62. The informing unit 62 is configured to inform the user of a state of the operating device 10. Examples of the state of the operating device 10 includes a communication state of the communicator WC, a level of remaining electricity of the power supply PS, and a pairing state of the wireless communicator WC1. Examples of the informing unit 62 include a light emitting device such as a light-emitting diode (LED) and a loudspeaker. In the first embodiment, the informing unit 62 is provided to the base member 36. However, the informing unit 62 can be provided other portions of the operating device 10 if needed and/or desired. The informing unit 62 can be omitted from the operating device 10 if needed and/or desired.

Figure 10:
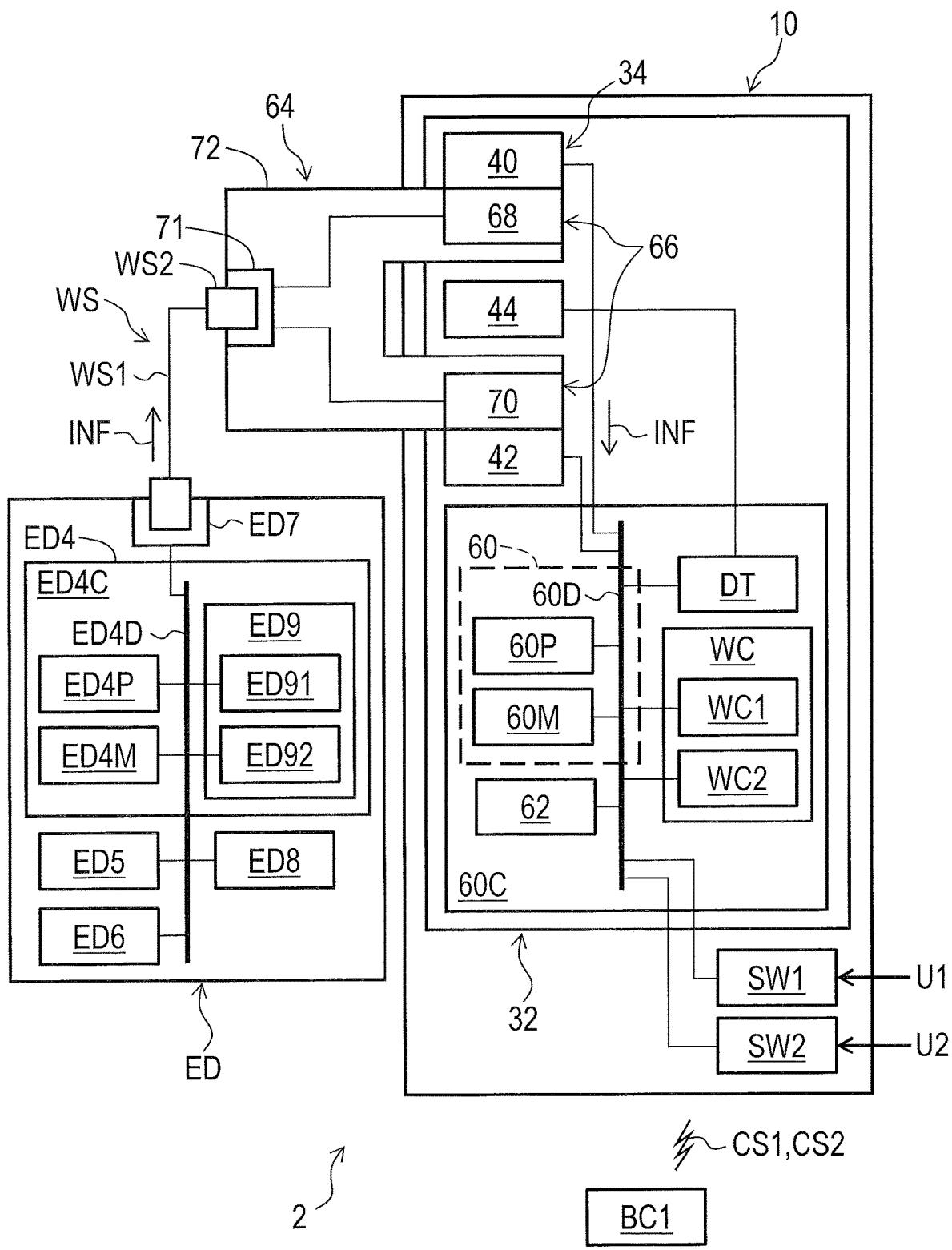
FIG. 10 is a schematic block diagram of the human-powered vehicle including the operating device illustrated in FIG. 1 (second state).

As seen in FIG. 10, the electrical contact 34 has a second state where the electrical contact 34 receives information INF from an external device ED. The electrical contact 34 is configured to receive the information INF from the external device ED in the second state. Examples of the external device ED includes a personal computer (e.g., a desktop computer or a laptop computer) a smart phone, and a tablet computer. The power supply PS is not in contact with the electrical contact 34 in the second state. In the second state, a device 64 for the human-powered vehicle 2 is in contact with the electrical contact 34 instead of the power supply PS. The device 64 is coupled to the electric device 32 in the second state. The controller 60 is configured to be electrically connected to the external device ED via the electrical contact 34 and the device 64.

As seen in FIG. 9, the electrical contact 34 is configured not to receive the information INF from the external device ED in the first state since the electrical contact 34 is in contact with the power supply PS.

As seen in FIG. 10, the device 64 for a human-powered vehicle 2 comprises a communication electrical contact 66. The communication electrical contact 66 is contactable with the electrical contact 34 of the electric device 32. The electrical contact 34 has the second state where the electrical contact 34 is in contact with the communication electrical contact 66. The communication electrical contact 66 can also be referred to as an additional electrical contact 66. The electrical contact 34 is configured to be in contact with the additional electrical contact 66 electrically connected to the external device ED in the second state.

The communication electrical contact 66 is configured to be in contact with the electrical contact 34 to allow communication between the external device ED and the electric device 32 via the communication electrical contact 66 and the electrical contact 34 in the second state of the electrical contact 34.

The communication electrical contact 66 includes a first communication electrical contact 68 and a second communication electrical contact 70. The first communication electrical contact 68 is contactable with the first electrical contact 40 of the electrical contact 34. The second communication electrical contact 70 is contactable with the second electrical contact 42 of the electrical contact 34.

The first communication electrical contact 68 is in contact with the first electrical contact 40 of the electrical contact 34 in the second state of the electrical contact 34. The second communication electrical contact 70 is in contact with the second electrical contact 42 of the electrical contact 34 in the second state of the electrical contact 34. The first communication electrical contact 68 is not in contact with the second electrical contact 42 and the third electrical contact 44 of the electrical contact 34 in the second state of the electrical contact 34. The second communication electrical contact 70 is not in contact with the first electrical contact 40 and the third electrical contact 44 of the electrical contact 34 in the second state of the electrical contact 34. The third electrical contact 44 is not in contact with the first communication electrical contact 68 and the second communication electrical contact 70.

As seen in FIG. 10, the device 64 further comprises a connection port 71. The connection port 71 is electrically connected to the communication electrical contact 66. The connection port 71 is configured to be connected to a connector WS2 electrically connected to the external device ED. The connection port 71 is electrically connected to the first communication electrical contact 68 and the second communication electrical contact 70. Examples of the connection port 71 include Universal Serial Bus (USB), USB-C™, Thunderbolt™, and High-Definition Multimedia Interface (HDMI)™.

In the first embodiment, the wired communication structure WS is configured to electrically connect the external device ED and the device 64. The wired communication structure WS the electric cable WS1. The electric cable WS1 includes the connector WS2. The connector WS2 is detachably attached to the connection port 71 of the device 64. However, the wired communication structure WS can include at least one of at least one electric cable, at least one junction, and other connecting components.

The external device ED includes an external controller ED4, a user interface ED5, an electric power source ED6, an external connection port ED7, a display ED8, and an external communicator ED9. The external controller ED4 is electrically connected to the user interface ED5, the electric power source ED6, the external connection port ED7, the display ED8, and the external communicator ED9.

The external controller ED4 includes a processor ED4P, a memory ED4M, a circuit board ED4C, and a bus ED4D. The processor ED4P and the memory ED4M are electrically mounted on the circuit board ED4C. The processor ED4P and the memory ED4M are electrically connected to the circuit board ED4C via the bus ED4D. The processor ED4P is electrically connected to the memory ED4M via the circuit board ED4C and the bus ED4D.

For example, the processor ED4P includes at least one of a CPU, a MPU, and a memory controller. The memory ED4M is electrically connected to the processor ED4P. For example, the memory ED4M includes at least one of a volatile memory and a non-volatile memory. Examples of the volatile memory include a RAM and a DRAM. Examples of the non-volatile memory include a ROM and an electrically erasable programmable ROM. The memory ED4M includes storage areas each having an address in the ROM and the RAM. The processor ED4P is configured to control the memory ED4M to store data in the storage areas of the memory ED4M and reads data from the storage areas of the memory ED4M. The processor ED4P can also be referred to as a hardware processor ED4P. The memory ED4M can also be referred to as a hardware memory ED4M. The memory ED4M can also be referred to as a computer-readable storage medium ED4M.

The external controller ED4 is programed to execute at least one control algorithm of the electric device 32. The memory ED4M (e.g., the ROM) stores at least one program including at least one program instructions. The at least one program is read into the processor ED4P, and thereby the at least one control algorithm of the electric device 32 is executed based on the at least one program. The external controller ED4 can also be referred to as a control circuit or circuitry ED4. The external controller ED4 can also be referred to as an external hardware controller ED4.

The structure of the external controller ED4 is not limited to the above structure. The structure of the external controller ED4 is not limited to the processor ED4P, the memory ED4M, the circuit board ED4C, and the bus ED4D. The external controller ED4 can be realized by hardware alone or a combination of hardware and software. The processor ED4P and the memory ED4M can be integrated as a one chip such as an ASIC or a FPGA.

The user interface ED5 includes at least one of a keyboard and a touch panel. The user interface ED5 is configured to receive input from the user. The external controller ED4 is configured to obtain the input from the user interface ED5.

The electric power source ED6 includes at least one of a direct-current (DC) power source and an alternating-current (AC) power source. The electric power source ED6 is electrically connected to the external controller ED4, the user interface ED5, the external connection port ED7, the display ED8, and the external communicator ED9 to supply electricity to the external controller ED4, the user interface ED5, the external connection port ED7, the display ED8, and the external communicator ED9.

The external connection port ED7 is configured to be detachably connected to the electric cable WS1. Examples of the external connection port ED7 include USB, USB-C™, Thunderbolt™, and High-Definition Multimedia Interface (HDMI)™. The display ED8 is configured to display information. The external controller ED4 is configured to control the display ED8 to display information.

The external communicator ED9 is configured to communicate with another communicator such as the communicator WC of the electric device 32. The external communicator ED9 includes a wireless communicator ED91 and a wired communicator ED92.

The wireless communicator ED91 has substantially the same structure of the wireless communicator WC1 of the electric device 32. The wired communicator ED92 has substantially the same structure of the wired communicator WC2 of the electric device 32.

The wireless communicator ED91 is electrically connected to the external controller ED4. The wireless communicator ED91 is electrically connected to the processor ED9P and the memory ED9M with the circuit board ED4C and the bus ED9D. The wireless communicator ED91 includes a signal transmitting circuit or circuitry, a signal receiving circuit or circuitry, and an antenna. Thus, the wireless communicator ED91 can also be referred to as a wireless communicator circuit or circuitry ED91.

The wireless communicator ED91 is configured to superimpose signals on carrier wave using a predetermined wireless communication protocol to wirelessly transmit signals. In the first embodiment, the wireless communicator ED91 is configured to encrypt signals using a cryptographic key to generate encrypted wireless signals. The wireless communicator ED91 is configured to transmit wireless signals via the antenna.

The wireless communicator ED91 is configured to receive wireless signals via the antenna. In the first embodiment, the wireless communicator ED91 is configured to decode the wireless signals to recognize signals transmitted from other wireless communicators. The wireless communicator ED91 is configured to decrypt the wireless signals using the cryptographic key.

Examples of the communication protocol of the wireless communicator ED91 include Wi-Fi®, Zigbee®, Bluetooth®, ANT®, and other wireless communication protocols.

The external controller ED4 is electrically connected to the wireless communicator ED91 to control the wireless communicator ED91 based on at least one of computation executed by the external controller ED4 and the input received by the user interface ED5. The external controller ED4 is configured to control the wireless communicator ED91 to wirelessly transmit the information INF to another device.

The external communicator ED9 is configured to communicate with an additional communicator of an additional component via the wired communication structure WS including the electric cable WS1 using PLC technology.

The wired communicator ED92 is configured to separate an input signal from a power source voltage supplied from the electric power source ED6. The wired communicator ED92 is configured to superimpose an output signal on the power source voltage supplied from the electric power source ED6. The wired communicator ED92 can also be referred to as a wired communicator circuit or circuitry ED92.

Figure 11:
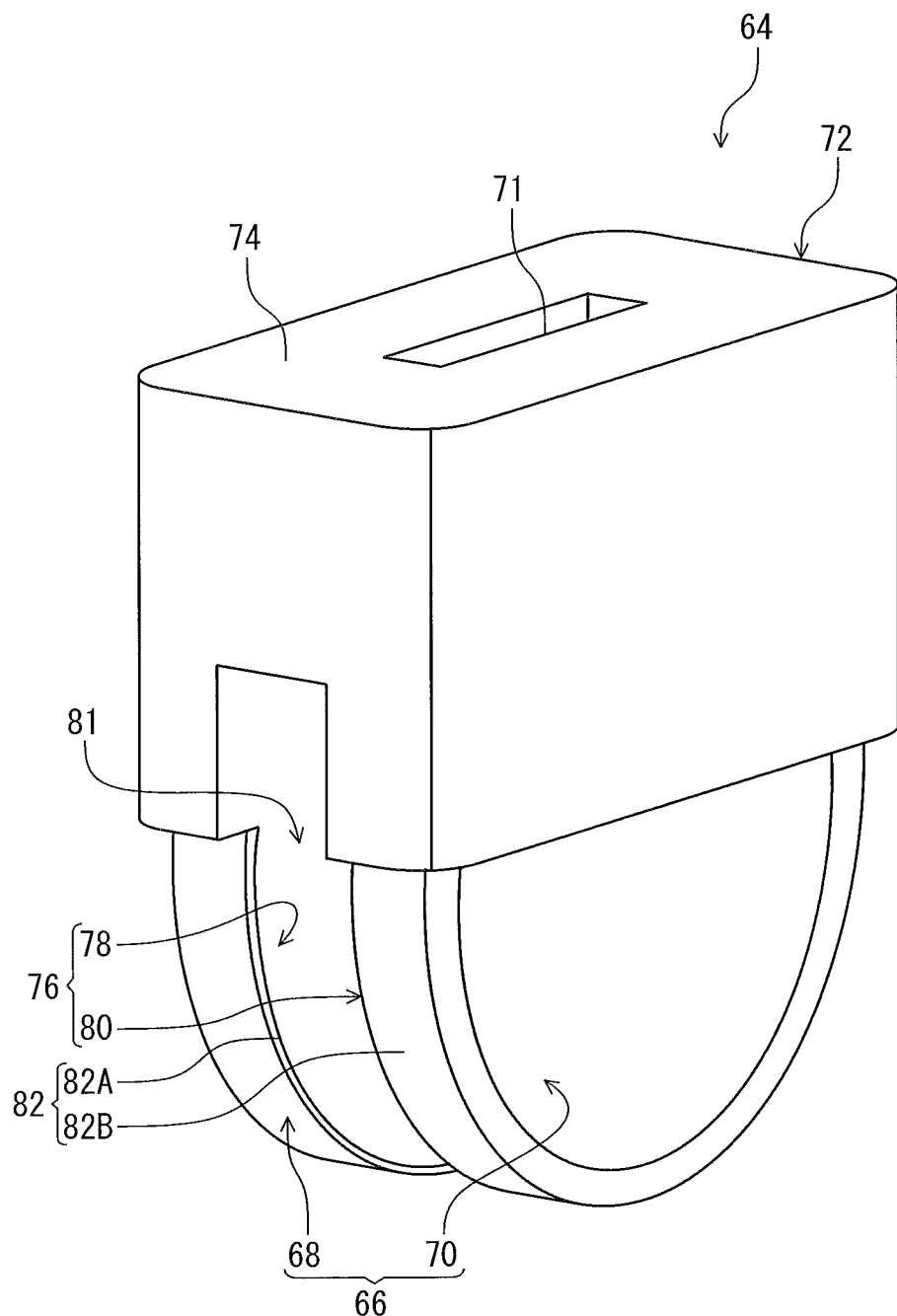
FIG. 11 is a perspective view of a device in accordance with the first embodiment.

As seen in FIG. 11, the device 64 further comprises a base 72. The communication electrical contact 66 is attached to the base 72. The connection port 71 is provided to the base 72. The base 72 includes a base body 74 and a protruding body 76. The protruding body 76 protrudes from the base body 74. The protruding body 76 includes a first protruding part 78 and a second protruding part 80. The first protruding part 78 protrudes from the base body 74. The second protruding part 80 protrudes from the base body 74. The second protruding part 80 is spaced apart from the first protruding part 78.

The first communication electrical contact 68 is spaced apart from the second communication electrical contact 70. The first communication electrical contact 68 is spaced apart from the second communication electrical contact 70 to define a recess 81 between the first communication electrical contact 68 and the second communication electrical contact 70. The first protruding part 78 is spaced apart from the second protruding part 80 to define the recess 81 between the first protruding part 78 and the second protruding part 80.

Figure 12:
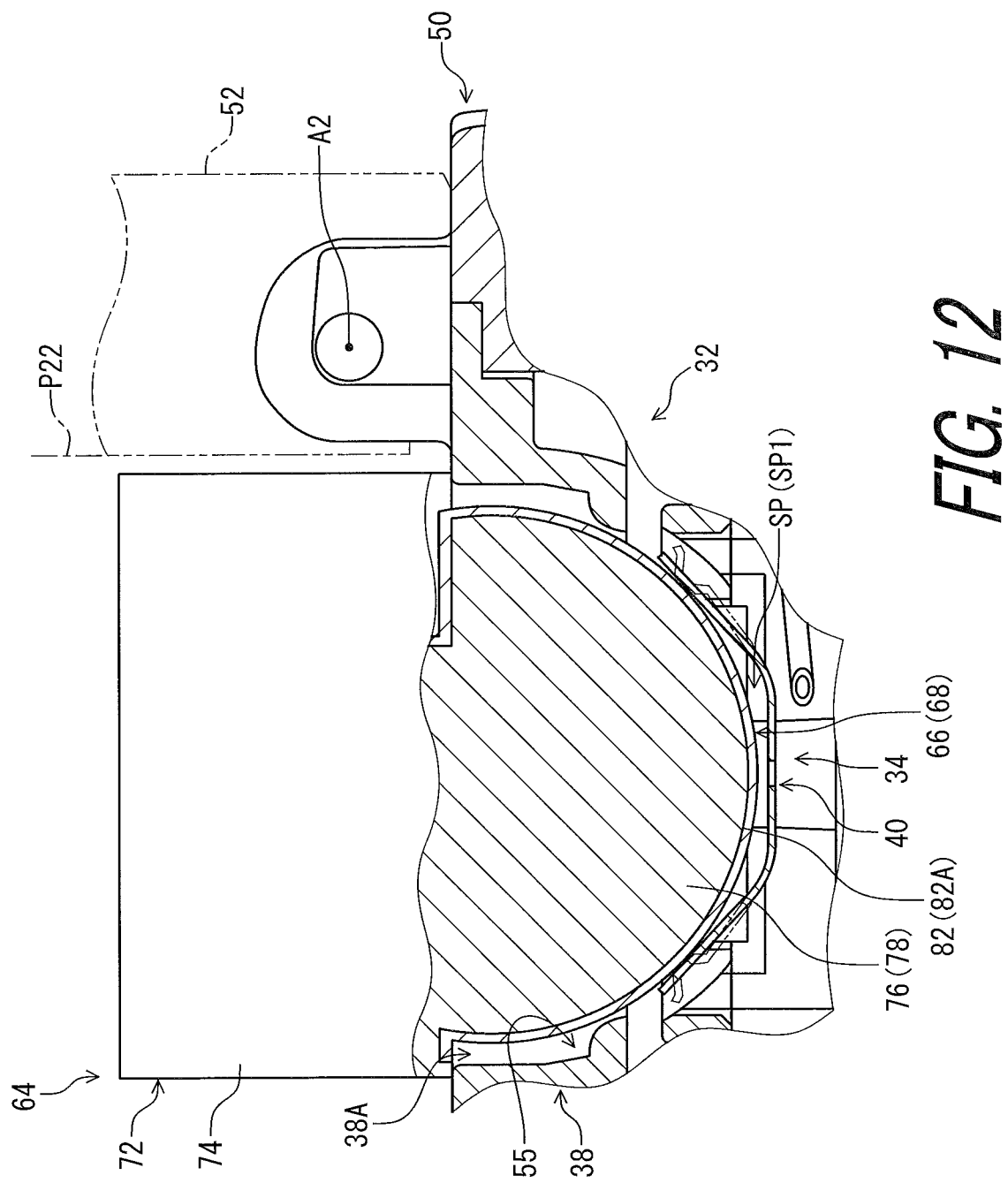
FIG. 12 is a cross-sectional view of the operating device taken along line XII-XII of FIG. 14.
Figure 13:
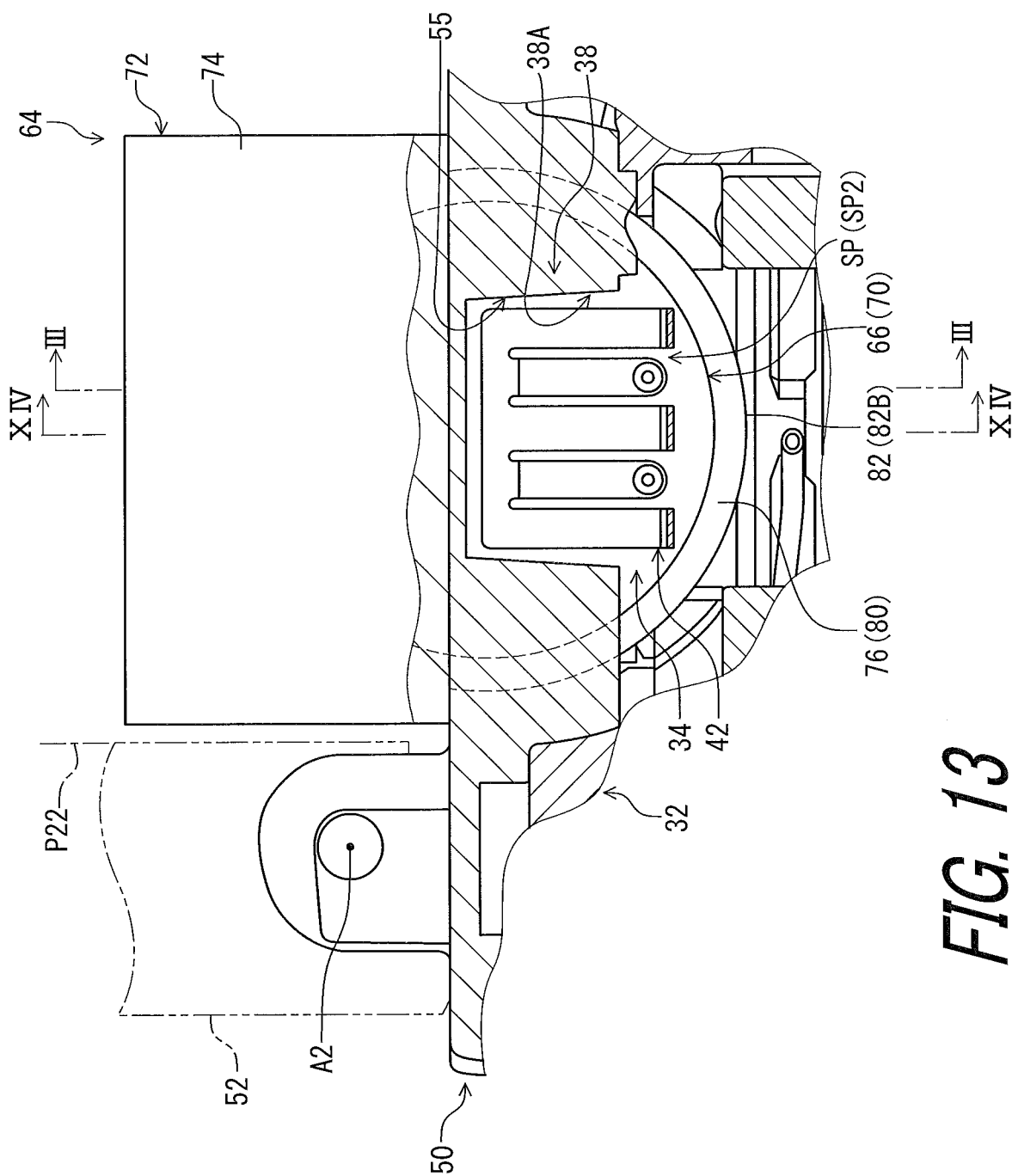
FIG. 13 is a cross-sectional view of the operating device taken along line XIII-XIII of FIG. 14.

As seen in FIGS. 12 and 13, the communication electrical contact 66 is at least partially provided to the protruding body 76. The first communication electrical contact 68 is at least partially provided to the first protruding part 78. The second communication electrical contact 70 is at least partially provided to the second protruding part 80. In the first embodiment, the communication electrical contact 66 is partially provided to the protruding body 76. However, the communication electrical contact 66 can be entirely provided to the protruding body 76 if needed and/or desired. The first communication electrical contact 68 can be entirely provided to the first protruding part 78 if needed and/or desired. The second communication electrical contact 70 can be entirely provided to the second protruding part 80 if needed and/or desired.

Figure 14:
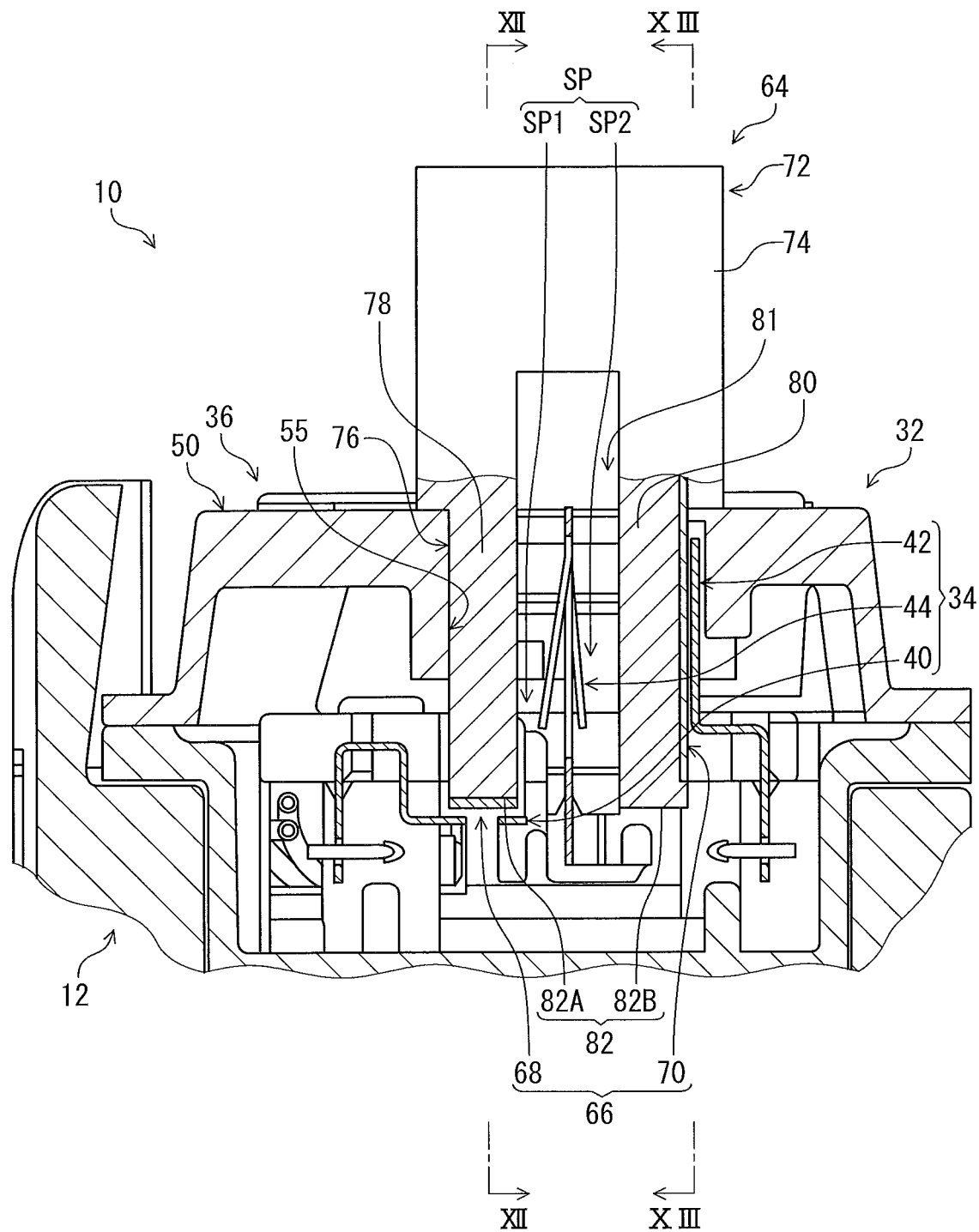
FIG. 14 is a cross-sectional view of the operating device taken along line XIV-XIV of FIG. 13.

As seen in FIG. 14, the base 72 is configured to be at least partially provided in the space SP defined by the electrical contact 34 of the electric device 32 in the second state of the electrical contact 34. In the first embodiment, the base 72 is configured to be partially provided in the space SP defined by the electrical contact 34 of the electric device 32 in the second state of the electrical contact 34. However, the base 72 can be configured to be entirely provided in the space SP in the second state of the electrical contact 34 if needed and/or desired.

The protruding body 76 is configured to be at least partially provided in the space SP defined by the electrical contact 34 of the electric device 32 in the second state of the electrical contact 34. In the first embodiment, the protruding body 76 is configured to be partially provided in the space SP in the second state of the electrical contact 34. The protruding body 76 is configured to be partially provided in the first space SP1 in the second state of the electrical contact 34. However, the protruding body 76 can be configured to be entirely provided in the space SP in the second state of the electrical contact 34 if needed and/or desired. The protruding body 76 can be configured to be entirely provided in the first space SP1 in the second state of the electrical contact 34 if needed and/or desired.

The first protruding part 78 is at least partially provided in the space SP in the second state of the electrical contact 34. The first protruding part 78 is at least partially provided in the first space SP1 in the second state of the electrical contact 34. In the first embodiment, the first protruding part 78 is partially provided in the space SP in the second state of the electrical contact 34. The first protruding part 78 is partially provided in the first space SP1 in the second state of the electrical contact 34. However, the first protruding part 78 can be entirely provided in the space SP in the second state of the electrical contact 34 if needed and/or desired. The first protruding part 78 can be entirely provided in the first space SP1 in the second state of the electrical contact 34 if needed and/or desired.

The second protruding part 80 is at least partially provided in the space SP in the second state of the electrical contact 34. The second protruding part 80 is at least partially provided in the second space SP2 in the second state of the electrical contact 34. In the first embodiment, the second protruding part 80 is partially provided in the space SP in the second state of the electrical contact 34. The second protruding part 80 is partially provided in the second space SP2 in the second state of the electrical contact 34. However, the second protruding part 80 can be entirely provided in the space SP in the second state of the electrical contact 34 if needed and/or desired. The second protruding part 80 can be entirely provided in the second space SP2 in the second state of the electrical contact 34 if needed and/or desired.

The electrical contact 34 is at least partially provided in the recess 81. The third electrical contact 44 is at least partially provided in the recess 81. In the first embodiment, the electrical contact 34 is partially provided in the recess 81. The third electrical contact 44 is partially provided in the recess 81. However, the electrical contact 34 can be entirely provided in the recess 81 if needed and/or desired. The third electrical contact 44 can be entirely provided in the recess 81 if needed and/or desired.

As seen in FIGS. 12 and 13, the protruding body 76 includes an outer peripheral surface 82. The outer peripheral surface 82 is configured to be at least partially provided in the space SP in the second state of the electrical contact 34. In the first embodiment, the outer peripheral surface 82 is configured to be partially provided in the space SP in the second state of the electrical contact 34. However, the outer peripheral surface 82 can be configured to be entirely provided in the space SP in the second state of the electrical contact 34 if needed and/or desired.

As seen in FIGS. 12 and 13, the outer peripheral surface 82 includes a first outer peripheral surface 82A and a second outer peripheral surface 82B. As seen in FIG. 12, the first protruding part 78 includes the first outer peripheral surface 82A. As seen in FIG. 13, the second protruding part 80 includes the second outer peripheral surface 82B.

As seen in FIGS. 12 and 14, the first outer peripheral surface 82A is configured to be at least partially provided in the space SP in the second state of the electrical contact 34. The first outer peripheral surface 82A is configured to be at least partially provided in the first space SP1 in the second state of the electrical contact 34. In the first embodiment, the first outer peripheral surface 82A is configured to be partially provided in the space SP in the second state of the electrical contact 34. The first outer peripheral surface 82A is configured to be partially provided in the first space SP1 in the second state of the electrical contact 34. However, the first outer peripheral surface 82A can be configured to be entirely provided in the space SP in the second state of the electrical contact 34 if needed and/or desired. The first outer peripheral surface 82A can be configured to be entirely provided in the first space SP1 in the second state of the electrical contact 34 if needed and/or desired.

As seen in FIGS. 13 and 14, the second outer peripheral surface 82B is configured to be at least partially provided in the space SP in the second state of the electrical contact 34. The second outer peripheral surface 82B is configured to be at least partially provided in the second space SP2 in the second state of the electrical contact 34. In the first embodiment, the second outer peripheral surface 82B is configured to be partially provided in the space SP in the second state of the electrical contact 34. The second outer peripheral surface 82B is configured to be partially provided in the second space SP2 in the second state of the electrical contact 34. However, the second outer peripheral surface 82B can be configured to be entirely provided in the space SP in the second state of the electrical contact 34 if needed and/or desired. The second outer peripheral surface 82B can be configured to be entirely provided in the second space SP2 in the second state of the electrical contact 34 if needed and/or desired.

As seen in FIGS. 12 to 14, the communication electrical contact 66 is configured to be at least partially provided in the space SP defined by the electrical contact 34 of the electric device 32 in the second state of the electrical contact 34. The space SP is configured to at least partially accommodate the additional electrical contact 66 electrically connected to the external device ED in the second state.

In the first embodiment, the communication electrical contact 66 is configured to be partially provided in the space SP defined by the electrical contact 34 of the electric device 32. The space SP is configured to partially accommodate the additional electrical contact 66 electrically connected to the external device ED in the second state. However, the communication electrical contact 66 can be configured to be entirely provided in the space SP defined by the electrical contact 34 of the electric device 32 if needed and/or desired. The space SP can be configured to entirely accommodate the additional electrical contact 66 electrically connected to the external device ED in the second state if needed and/or desired.

As seen in FIGS. 12 and 14, the first communication electrical contact 68 is configured to be at least partially provided in the space SP in the second state of the electrical contact. The first communication electrical contact 68 is configured to be at least partially provided in the first space SP1 in the second state of the electrical contact 34. In the first embodiment, the first communication electrical contact 68 is configured to be partially provided in the space SP in the second state of the electrical contact 34. The first communication electrical contact 68 is configured to be partially provided in the first space SP1 in the second state of the electrical contact 34. However, the first communication electrical contact 68 can be configured to be entirely provided in the space SP in the second state of the electrical contact 34 if needed and/or desired. The first communication electrical contact 68 can be configured to be entirely provided in the first space SP1 in the second state of the electrical contact 34 if needed and/or desired.

As seen in FIGS. 13 and 14, the second communication electrical contact 70 is configured to be at least partially provided in the space SP in the second state of the electrical contact. The second communication electrical contact 70 is configured to be at least partially provided in the second space SP2 in the second state of the electrical contact 34. In the first embodiment, the second communication electrical contact 70 is configured to be partially provided in the space SP in the second state of the electrical contact 34. The second communication electrical contact 70 is configured to be partially provided in the second space SP2 in the second state of the electrical contact 34. However, the second communication electrical contact 70 can be configured to be entirely provided in the space SP in the second state of the electrical contact 34 if needed and/or desired. The second communication electrical contact 70 can be configured to be entirely provided in the second space SP2 in the second state of the electrical contact 34 if needed and/or desired.

As seen in FIG. 10, the electrical contact 34 is configured to receive electricity and the information INF from the external device ED in the second state. The electrical contact 34 is configured to receive electricity and the information INF from the external device ED via the communication electrical contact 66 in the second state of the electrical contact 34. The electrical contact 34 is configured to receive an input signal indicating the information INF in the second state. The information INF is superimposed on the power source voltage supplied from the external device ED to the electrical contact 34 in the second state.

In the first embodiment, the communication electrical contact 66 is configured to receive a voltage different from the power-supply voltage of the power supply PS. The voltage is applied from the external device ED to the communication electrical contact 66 in the second state.

However, the communication electrical contact 66 is configured to receive a voltage equal to the power-supply voltage of the power supply PS if needed and/or desired.

In the first embodiment, the communicator WC is configured to separate an input signal indicating the information INF from the power source voltage supplied from the external device ED to the electrical contact 34. The communicator WC is configured to superimpose an output signal on the power source voltage supplied from the external device ED to the electrical contact 34. The wired communicator WC2 is configured to separate the input signal indicating the information INF from the power source voltage supplied from the external device ED to the electrical contact 34. The wired communicator WC2 is configured to superimpose the output signal on the power source voltage supplied from the external device ED to the electrical contact 34. However, the communicator WC can be configured not to separate the input signal from the power source voltage supplied from the external device ED to the electrical contact 34 if needed and/or desired. The communicator WC can be configured to superimpose the output signal on the power source voltage supplied from the external device ED to the electrical contact 34 if needed and/or desired.

As seen in FIG. 10, the electric device 32 further comprises a detector DT. The detector DT is electrically connected to the electrical contact 34. The detector DT is configured to detect whether the electrical contact 34 is in the first state or the second state. The detector DT is electrically connected to the controller 60. The detector DT is electrically mounted on the circuit board 60C. The detector DT is electrically connected to the processor 60P and the memory 60M via the circuit board 60C and the bus 60D. The controller 60 is configured to receive a detection result of the detector DT. Thus, the controller 60 is configured to recognize whether the electrical contact 34 is in the first state or the second state.

The detector DT is electrically connected to at least one of the first electrical contact 40, the second electrical contact 42, and the third electrical contact 44. In the first embodiment, the detector DT is electrically connected to the third electrical contact 44. However, the detector DT can be electrically connected to at least one of the first electrical contact 40, the second electrical contact 42, and the third electrical contact 44 if needed and/or desired.

The detector DT is configured to detect a voltage applied to the third electrical contact 44. The third electrical contact 44 is configured to receive a voltage applied from one of the first battery PS1 and the second battery PS2 in the first state (see e.g., FIG. 9). For example, each of the first battery PS1 and the second battery PS2 has an output voltage. The output voltage is applied between the third electrical contact 44 and one of the first electrical contact 40 and the second electrical contact 42 in the first state.

In the second state, the third electrical contact 44 is configured not to receive a voltage from the external device ED since the third electrical contact 44 is not in contact with the communication electrical contact 66 of the device 64 (see e.g., FIG. 14) in the second state. Thus, the voltage applied to the third electrical contact 44 is zero in the second state.

The detector DT is configured to measure a voltage applied to the third electrical contact 44. The detector DT is configured to detect that the electrical contact 34 is in the first state if the voltage measured by the detector DT is higher than a determination threshold. The determination threshold is lower than the output voltage applied to the third electrical contact 44 in the first state and higher than zero. The detector DT is configured to determine that the electrical contact 34 is in the second state if the voltage measured by the detector DT is lower than or equal to the determination threshold. The controller 60 is configured to recognize whether the electrical contact 34 is in the first state or the second state based on the detection result of the detector DT.

In a case where the third electrical contact 44 is omitted from the electrical contact 34, the detector DT is electrically connected to one of the first electrical contact 40 and the second electrical contact 42. In such modifications, one of the first battery PS1 and the second battery PS2 is omitted from the power supply PS. The detector DT is configured to detect a voltage applied between the first electrical contact 40 and the second electrical contact 42. The electric power source ED6 of the external device ED has a rated voltage which is higher than the output voltage of the power supply PS. Thus, the detector DT is configured to detect that the electrical contact 34 is in the first state if the voltage VD detected by the detector DT is lower than a determination threshold. The detector DT is configured to detect that the electrical contact 34 is in the second state if the voltage VD detected by the detector DT is higher than or equal to the determination threshold.

The detector DT is not limited to the illustrated embodiment. For example, the detector DT can be configured to detect whether the electrical contact 34 is in the first state or the second state using other methods other than a voltage.

The controller 60 is configured to use the wireless communicator WC1 to communicate with the external device ED if the detection result of the detector DT indicates that the electrical contact 34 is in the first state. The controller 60 is configured to control the wireless communicator WC1 to wirelessly transmit the control signal CS1 in response to the activation of the switch SW1 if the detection result of the detector DT indicates that the electrical contact 34 is in the first state. The controller 60 is configured to control the wireless communicator WC1 to wirelessly transmit the control signal CS2 in response to the activation of the switch SW2 if the detection result of the detector DT indicates that the electrical contact 34 is in the first state.

The controller 60 is configured to use the wired communicator WC2 to communicate with the external device ED if the detection result of the detector DT indicates that the electrical contact 34 is in the second state. The controller 60 is configured to control the wired communicator WC2 to receive the information INF from the external device ED if the detection result of the detector DT indicates that the electrical contact 34 is in the second state. The controller 60 is configured to control the wired communicator WC2 to transmit additional information to the external device ED if the detection result of the detector DT indicates that the electrical contact 34 is in the second state.

The information INF transmitted from the external device ED to the electric device 32 includes firmware information and setting information. The firmware information includes firmware updates of electric components installed in at least one of the electric device 32 and the operating device 10. The setting information includes settings of at least one of the electric device 32 and the operating device 10. The controller 60 is configured to execute firmware updates if the controller 60 receives the firmware information from the external device ED. The controller 60 is configured to change the settings based on the setting information if the controller 60 receives the setting information from the external device ED.

Figure 15:
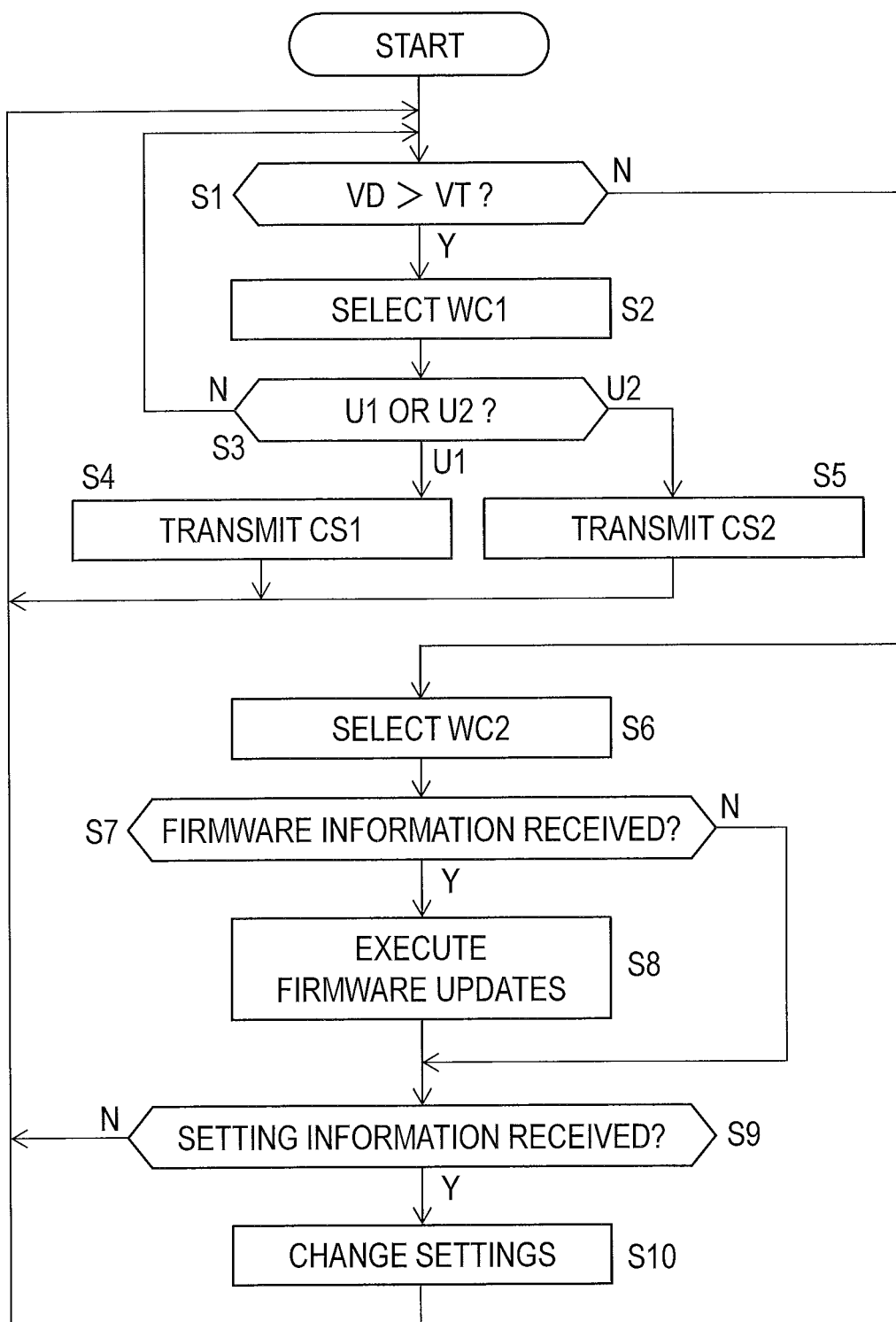
FIG. 15 is a flowchart showing control of the electric device of the operating device illustrated in FIG. 1.

The control executed by the electric device 32 will be described below referring to FIG. 15.

The voltage VD detected by the detector DT is compared to a determination threshold VT (step S1). The controller 60 is configured to store the determination threshold VT in the memory 60M. The wireless communicator WC1 is selected by the controller 60 if the voltage VD detected by the detector DT is higher than the determination threshold VT (steps S1 and S2). The wired communicator WC2 is selected by the controller 60 if the voltage VD detected by the detector DT is lower than or equal to the determination threshold VT (steps S1 and S6).

It is determined by the controller 60 whether the switch SW1 or SW2 receives the user input U1 or U2 if the wireless communicator WC1 is selected by the controller 60 (step S3). For example, it is determined by the controller 60 whether the switch SW1 or SW2 is activated in response to the user input U1 or U2 if the wireless communicator WC1 is selected by the controller 60 (step S3).

The control signal CS1 is wirelessly transmitted by the wireless communicator WC1 in response to the user input U1 received by the switch SW1 (steps S3 and S4). The control signal CS2 is wirelessly transmitted by the wireless communicator WC1 in response to the user input U2 received by the switch SW2 (steps S3 and S5). The process returns to the step S1 after the control signal CS1 or CS2 is transmitted.

It is determined by the controller 60 whether the information INF is transmitted from the external device ED if the wired communicator WC2 is selected by the controller 60 in the step S6 (steps S7 and S9). The firmware updates are executed by the controller 60 based on the firmware information if the firmware information is transmitted from the external device ED (steps S7 and S8). The settings are changed by the controller based on the setting information if the setting information is transmitted from the external device ED (steps S9 and 10). The process returns to the step S1.

Second Embodiment

A device 264 in accordance with a second embodiment will be described below referring to FIGS. 16 to 22. The device 264 has the same structure and/or configuration as those of the device 64 except that the device 264 is configured to wirelessly communicate with the external device ED. Thus, elements having substantially the same function as those in the first embodiment will be numbered the same here and will not be described and/or illustrated again in detail here for the sake of brevity.

Figure 16:
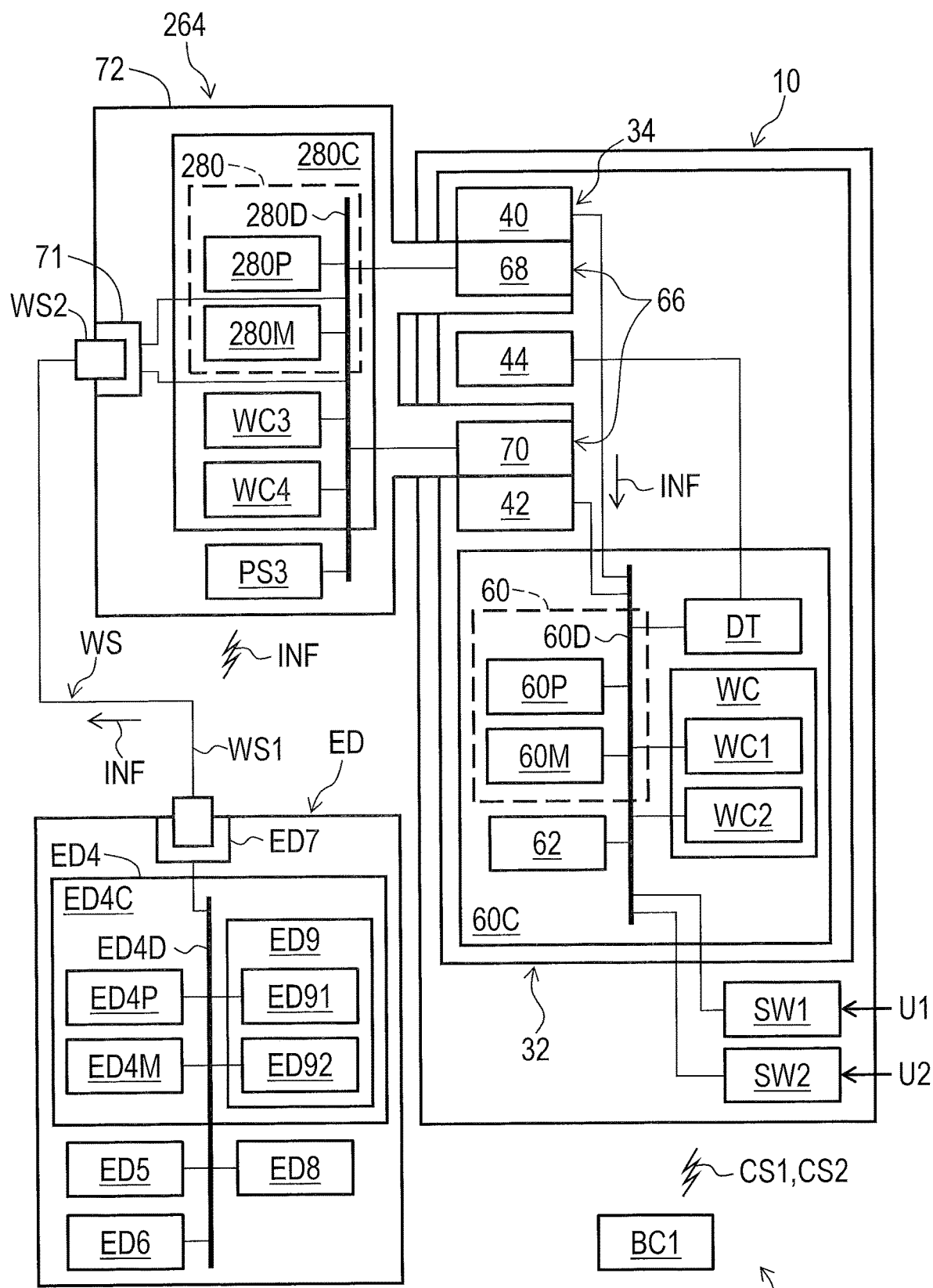
FIG. 16 is a schematic block diagram of the human-powered vehicle including a device in accordance with a second embodiment (second state).

As seen in FIG. 16, the device 264 for the human-powered vehicle 2 comprises the communication electrical contact 66. The communication electrical contact 66 is configured to be in contact with the electrical contact 34 to allow communication between the external device ED and the electric device 32 via the communication electrical contact 66 and the electrical contact 34 in the second state of the electrical contact 34. The device 264 has substantially the same structure as the structure of the device 64 of the first embodiment.

The device 264 further comprises a wireless communicator WC3. The wireless communicator WC3 is electrically connected to the communication electrical contact 66 to wirelessly communicate with the external device ED. The wireless communicator WC3 is configured to wirelessly communicate with the wireless communicator ED91 of the external device ED. The wireless communicator WC3 is configured to wirelessly receive the information INF from the wireless communicator ED91 of the external device ED.

In the present embodiment, the device 264 further comprises a wired communicator WC4. The wired communicator WC4 is electrically connected to the communication electrical contact 66 to communicate with the electric device 32 via the communication electrical contact 66. The wireless communicator WC3 is configured to transmit to the wired communicator WC4 the information INF wirelessly transmitted from the external device ED. The wired communicator WC4 is configured to transmit to the electric device 32 the information INF transmitted from the wireless communicator WC3 via the communication electrical contact 66 and the electrical contact 34.

The device 264 further comprises an additional power supply PS3. The additional power supply PS3 is electrically connected to the communication electrical contact 66 to supply electricity to the electric device 32 via the communication electrical contact 66 and the electrical contact 34. The additional power supply PS3 is electrically connected to the wireless communicator WC3 to supply electricity to the wireless communicator WC3. The additional power supply PS3 is electrically connected to the wired communicator WC4 to supply electricity to the wired communicator WC4.

The additional power supply PS3 is configured to supply electricity to the electric device 32 via the communication electrical contact 66 and the electrical contact 34 in the second state of the electrical contact 34. The additional power supply PS3 is electrically connected to the first communication electrical contact 68 and the second communication electrical contact 70 to supply electricity to the electric device 32 via the first communication electrical contact 68, the second communication electrical contact 70, the first electrical contact 40, and the second electrical contact 42.

For example, the additional power supply PS3 includes a battery and a battery holder. The battery holder is electrically connected to the additional controller 280. The battery is configured to be detachably attached to the battery holder. Examples of the battery include a primary battery and a secondary battery.

The wired communicator WC4 is configured to communicate with the wired communicator WC2 of the electric device 32 via the communication electrical contact 66 and the electrical contact 34 using the PLC. The wired communicator WC2 is configured to communicate with the wired communicator WC4 using the power source voltage supplied from the additional power supply PS3.

The device 264 comprises an additional controller 280. The additional controller 280 is electrically connected to the wireless communicator WC3, the wired communicator WC4, and the additional power supply PS3. The additional power supply PS3 is configured to supply electricity to the wireless communicator WC3, the wired communicator WC4, and the additional controller 280. The additional controller 280 is configured to control the wireless communicator WC3 and the wired communicator WC4.

The additional controller 280 includes a processor 280P, a memory 280M, a circuit board 280C, and a bus 280D. Namely, the device 264 further comprises the memory 280M. The processor 280P and the memory 280M are electrically mounted on the circuit board 280C. The processor 280P and the memory 280M are electrically connected to the circuit board 280C via the bus 280D. The processor 280P is electrically connected to the memory 280M via the circuit board 280C and the bus 280D.

For example, the processor 280P includes at least one of a CPU, a MPU, and a memory controller. The memory 280M is electrically connected to the processor 280P. For example, the memory 280M includes at least one of a volatile memory and a non-volatile memory. Examples of the volatile memory include a RAM and a DRAM. Examples of the non-volatile memory include a ROM and an electrically erasable programmable ROM. The memory 280M includes storage areas each having an address in the ROM and the RAM. The processor 280P is configured to control the memory 280M to store data in the storage areas of the memory 280M and reads data from the storage areas of the memory 280M. The processor 280P can also be referred to as a hardware processor 280P. The memory 280M can also be referred to as a hardware memory 280M. The memory 280M can also be referred to as a computer-readable storage medium 280M.

The additional controller 280 is programed to execute at least one control algorithm of the electric device 32. The memory 280M (e.g., the ROM) stores at least one program including at least one program instructions. The at least one program is read into the processor 280P, and thereby the at least one control algorithm of the electric device 32 is executed based on the at least one program. The additional controller 280 can also be referred to as an additional control circuit or circuitry 280. The additional controller 280 can also be referred to as an additional hardware controller 280.

The structure of the additional controller 280 is not limited to the above structure. The structure of the additional controller 280 is not limited to the processor 280P, the memory 280M, the circuit board 280C, and the bus 280D. The additional controller 280 can be realized by hardware alone or a combination of hardware and software. The processor 280P and the memory 280M can be integrated as a one chip such as an ASIC or a FPGA.

The memory 280M is electrically connected to the communication electrical contact 66. The memory 280M is configured to store the information INF received from the external device ED. The memory 280M is configured to store the information INF wirelessly transmitted from the wireless communicator ED91 of the external device ED to the wireless communicator WC3. The wired communicator WC4 is configured to transmit the information INF stored in the memory 280M to the electric device 32 via the communication electrical contact 66 and the electrical contact 34. The wired communicator WC4 is configured to transmit the information INF stored in the memory 280M to the wired communicator WC2 of the electric device 32 via the communication electrical contact 66 and the electrical contact 34. The controller 60 of the electric device 32 is configured to utilize the information INF transmitted from the wired communicator WC4 of the device 264 to the wired communicator WC2 of the electric device 32.

The wireless communicator WC3 has substantially the same structure of the wireless communicator WC1 of the electric device 32. The wireless communicator WC3 is electrically connected to the additional controller 280. The wireless communicator WC3 is electrically connected to the processor 280P and the memory 280M with the circuit board 280C and the bus 280D. The wireless communicator WC3 includes a signal transmitting circuit or circuitry, a signal receiving circuit or circuitry, and an antenna. Thus, the wireless communicator WC3 can also be referred to as a wireless communicator circuit or circuitry WC3.

The wireless communicator WC3 is configured to superimpose signals on carrier wave using a predetermined wireless communication protocol to wirelessly transmit signals. In the first embodiment, the wireless communicator WC3 is configured to encrypt signals using a cryptographic key to generate encrypted wireless signals. The wireless communicator WC3 is configured to transmit wireless signals via the antenna.

The wireless communicator WC3 is configured to receive wireless signals via the antenna. In the first embodiment, the wireless communicator WC3 is configured to decode the wireless signals to recognize signals transmitted from other wireless communicators. The wireless communicator WC3 is configured to decrypt the wireless signals using the cryptographic key.

Examples of the communication protocol of the wireless communicator WC3 include Wi-Fi®, Zigbee®, Bluetooth®, ANT®, and other wireless communication protocols.

The additional controller 280 is electrically connected to the wireless communicator WC3 to control the wireless communicator WC3 based on the infoi nation transmitted from the external device ED. The additional controller 280 is configured to control the wireless communicator WC3 to wirelessly receive the information INF from the external device ED.

The wired communicator WC4 is configured to communicate with the wired communicator ED92 of the external device ED via the wired communication structure WS using PLC technology.

The wired communicator WC4 is configured to separate an input signal from a power source voltage supplied from the additional power supply PS3. The wired communicator WC4 is configured to superimpose an output signal on the power source voltage supplied from the additional power supply PS3. The wired communicator WC4 can also be referred to as a wired communicator circuit or circuitry WC4.

In the second embodiment, the device 264 comprises the connection port 71. The connection port 71 is electrically connected to the wired communicator WC4. The wired communicator WC4 of the device 264 is configured to communicate with the external device ED via the connection port 71 without the wireless communicator WC3. However, the connection port 71 can be omitted from the device 264 if needed and/or desired.

Figure 17:
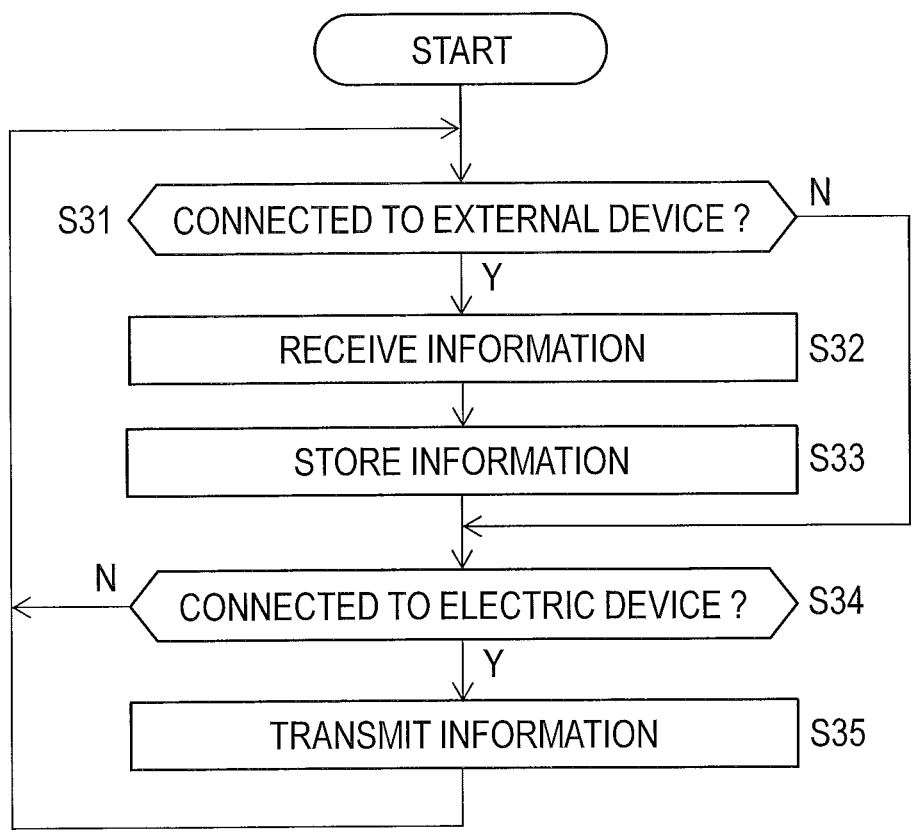
FIG. 17 is a flowchart showing control of the device illustrated in FIG. 16.

The control executed by the device 264 will be described below referring to FIG. 17.

It is determined by the additional controller 280 whether the device 264 is connected to the external device ED (step S31). For example, it is determined by the additional controller 280 whether the device 264 is wirelessly connected to the external device ED (see e.g., FIG. 18) or whether the device 264 is connected to the external device ED via the connection port 71 and the wired communication structure WS (see e.g., FIG. 19). It is determined by the additional controller 280 whether the wireless communicator WC3 of the device 264 is wirelessly connected to the wireless communicator ED91 of the external device ED (see e.g., FIG. 18) or whether the wired communicator WC4 of the device 264 is connected to the wired communicator ED92 of the external device ED via the connection port 71 and the wired communication structure WS (see e.g., FIG. 19). More specifically, it is determined by the additional controller 280 whether pairing has been completed between the wireless communicator WC3 of the device 264 and the wireless communicator ED91 of the external device ED in a case where the wireless communication is used between the external device ED and the device 264. It is determined by the additional controller 280 whether an acknowledge signal is transmitted from the wired communicator ED92 of the external device ED to the wired communicator WC4 of the device 264.

The information INF is transmitted from the external device ED to the device 264 after the device 264 is connected to the external device ED. Thus, the information INF is received by the device 264 from the external device (step S32). The information INF is stored in the memory 280M by the additional controller 280 (step S33).

It is determined by the additional controller 280 whether the device 264 is connected to the electric device 32 (step S34). For example, it is determined by the additional controller 280 whether the device 264 is connected to the electric device 32 via the communication electrical contact 66 and the electrical contact 34. It is determined by the additional controller 280 whether the wired communicator WC4 of the device 264 is connected to the wired communicator WC2 of the electric device 32 via the communication electrical contact 66 and the electrical contact 34.

The information INF is transmitted from the device 264 to the electric device 32 after the device 264 is connected to the electric device 32 (step S35). The process returns to the step S31. Thus, the information INF is stored in the memory 60M by the controller 60 and is utilized for at least one of firmware updates and settings of the electric device 32.

Figure 18:
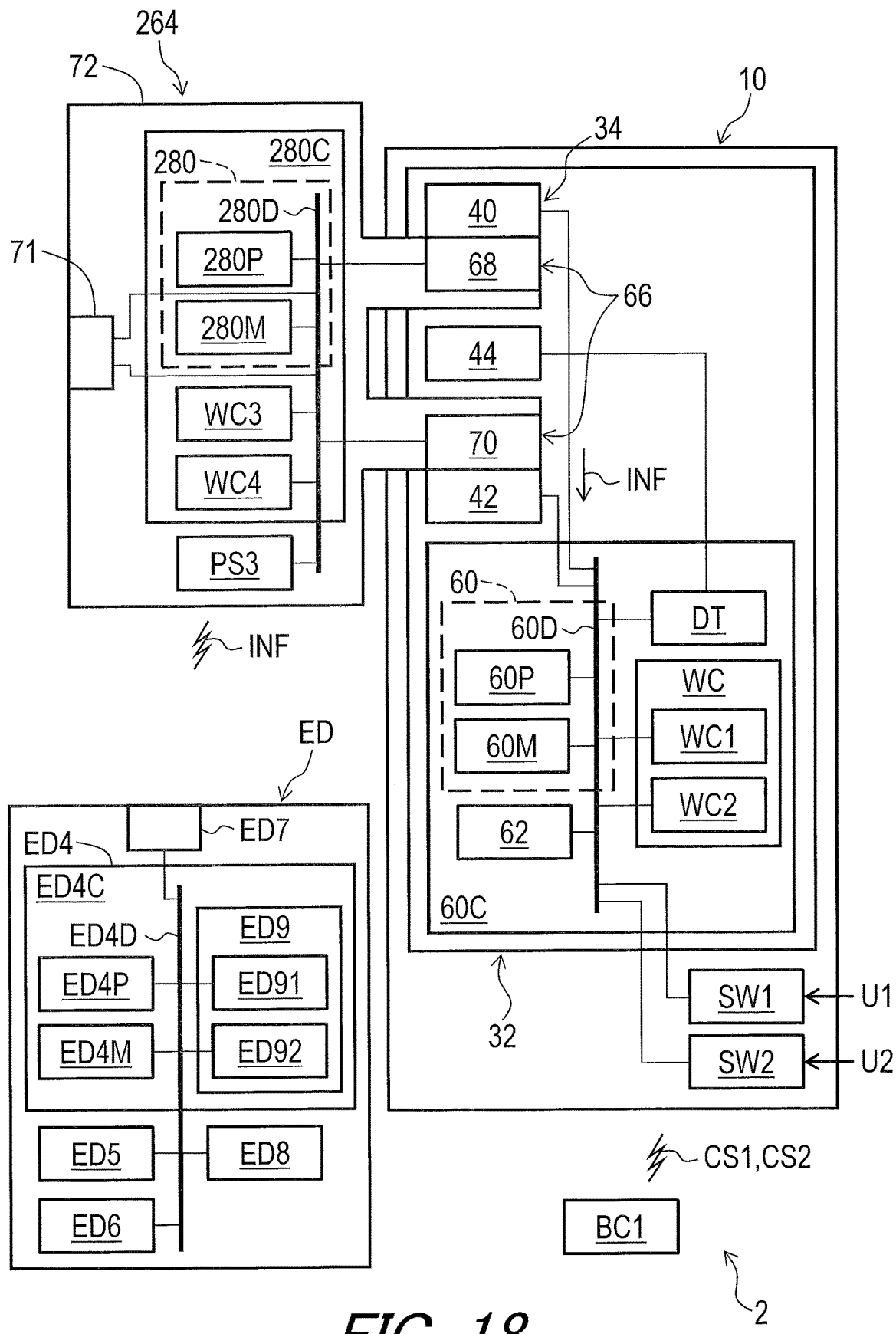
FIG. 18 is a schematic block diagram of the human-powered vehicle including the device illustrated in FIG. 16 (second state, wireless communication).

As seen in FIG. 18, the device 264 is configured to wirelessly receive the information INF from the external device ED in the state of the electrical contact 34. The additional controller 280 is configured to receive the information INF from the wireless communicator ED91 of the external device ED via the wireless communicator WC3 in the state of the electrical contact 34. The additional controller 280 is configured to transmit the information INF to the wired communicator WC2 of the electric device 32 via the wired communicator WC4 in the second state of the electrical contact 34.

Figure 20:
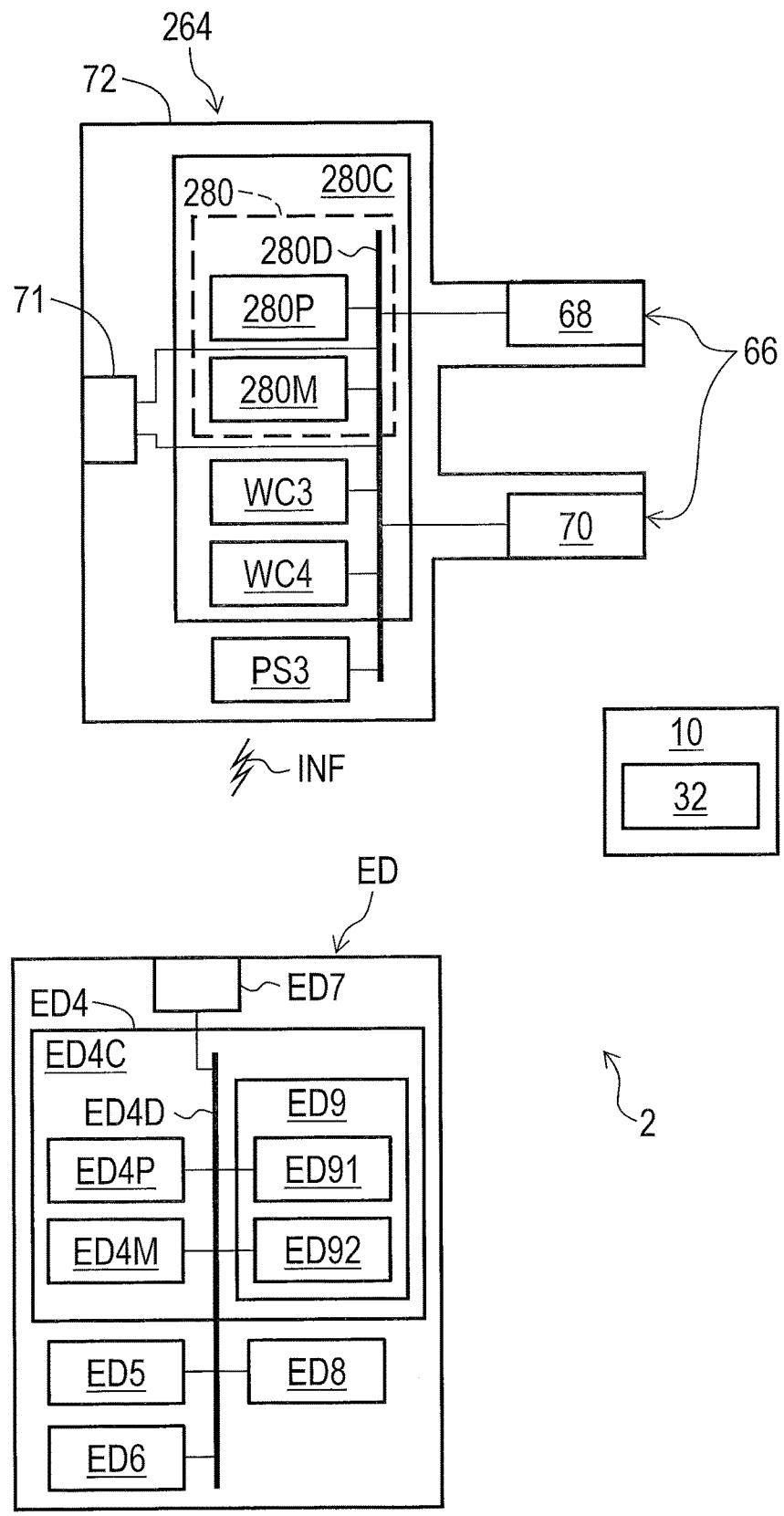
FIG. 20 is a schematic block diagram of an external device and the device illustrated in FIG. 16 (wireless communication).

Furthermore, as seen in FIG. 20, the device 264 is configured to wirelessly receive the information INF from the external device ED in a state where the device 264 is detached from the electric device 32. The additional controller 280 is configured to receive the information INF from the wireless communicator ED91 of the external device ED via the wireless communicator WC3 in the state where the device 264 is detached from the electric device 32. The additional controller 280 is configured to store the information INF in the state where the device 264 is detached from the electric device 32. The device 264 is detached from the external device ED after the additional controller 280 stores the information INF.

Figure 19:
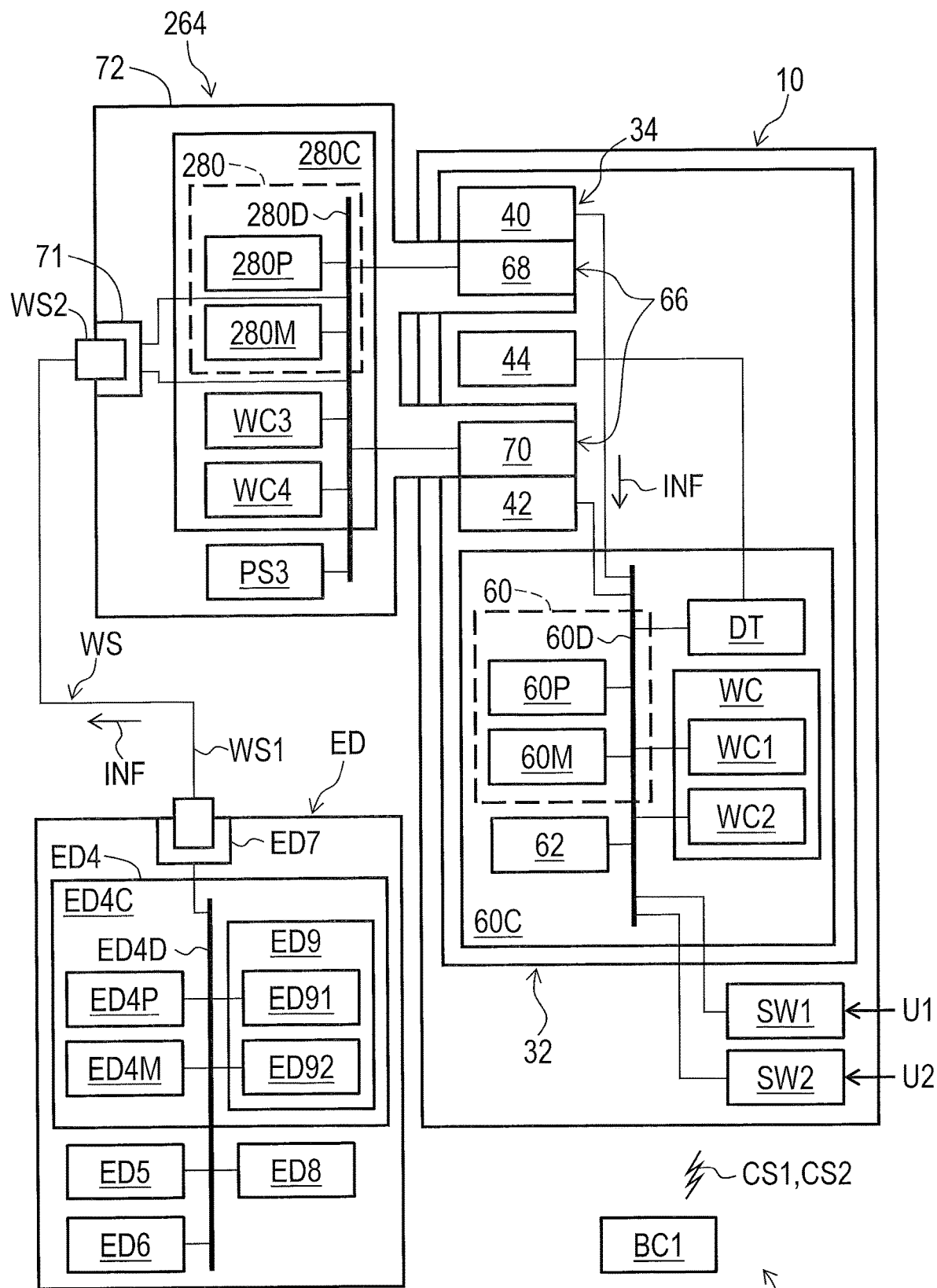
FIG. 19 is a schematic block diagram of the human-powered vehicle including the device illustrated in FIG. 16 (second state, wired communication).

Similarly to the wireless communication between the device 264 and the external device ED, as seen in FIG. 19, the device 264 is configured to receive the information INF from the external device ED via the wired communication structure WS and the connection port 71 in the second state of the electrical contact 34. The additional controller 280 is configured to receive the information INF from the wired communicator ED92 of the external device ED via the wired communicator WC4 in the state of the electrical contact 34. The additional controller 280 is configured to transmit the information INF to the wired communicator WC2 of the electric device 32 via the wired communicator WC4 in the second state of the electrical contact 34.

Figure 21:
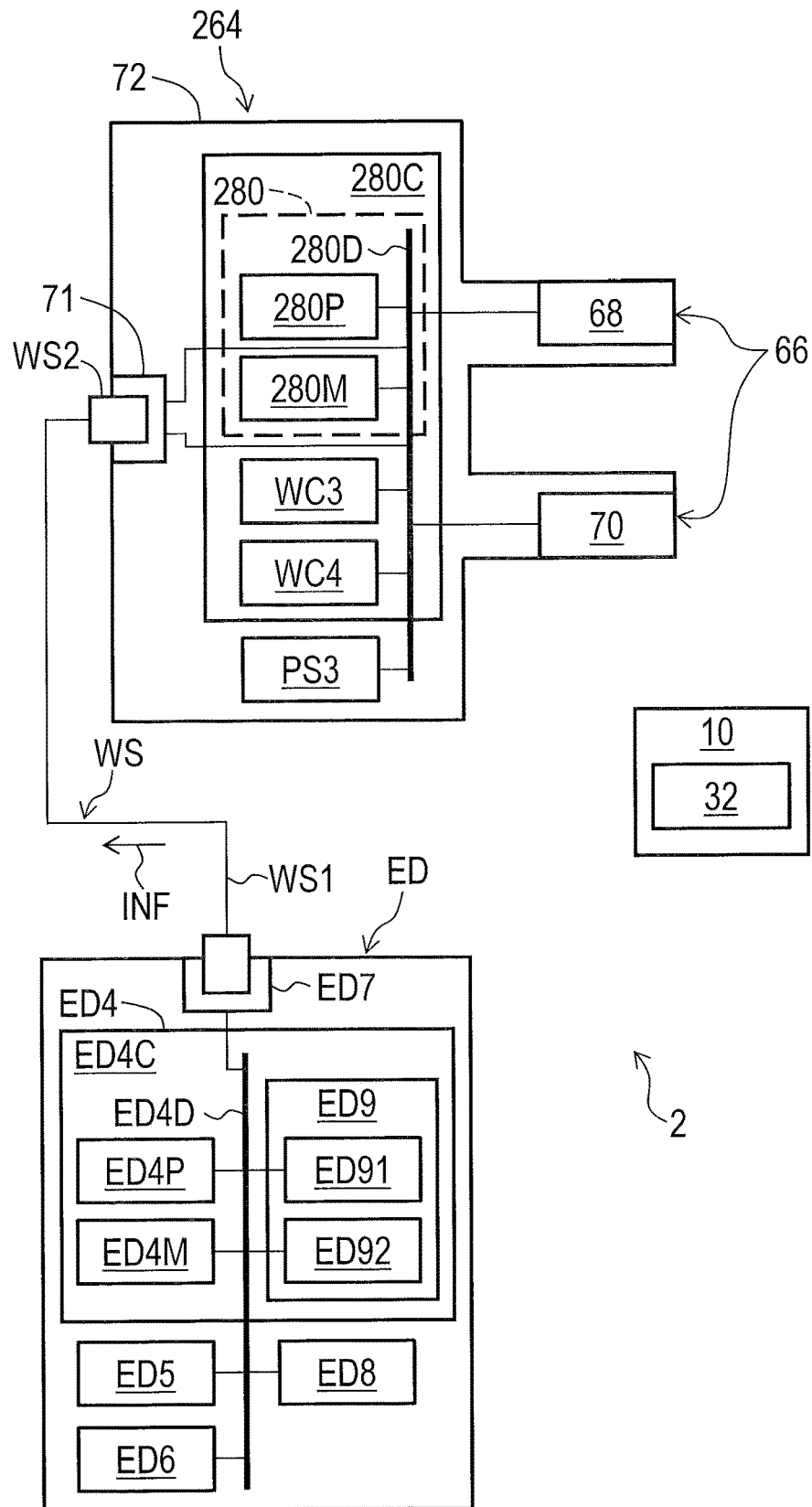
FIG. 21 is a schematic block diagram of the external device and the device illustrated in FIG. 16 (wired communication).

Furthermore, as seen in FIG. 21, the device 264 is configured to receive the information INF from the external device ED via the wired communication structure WS in the state where the device 264 is detached from the electric device 32. The additional controller 280 is configured to receive the information INF from the wired communicator ED92 of the external device ED via the wired communicator WC4 in the state where the device 264 is detached from the electric device 32. The additional controller 280 is configured to store the information INF in the state where the device 264 is detached from the electric device 32.

Figure 22:
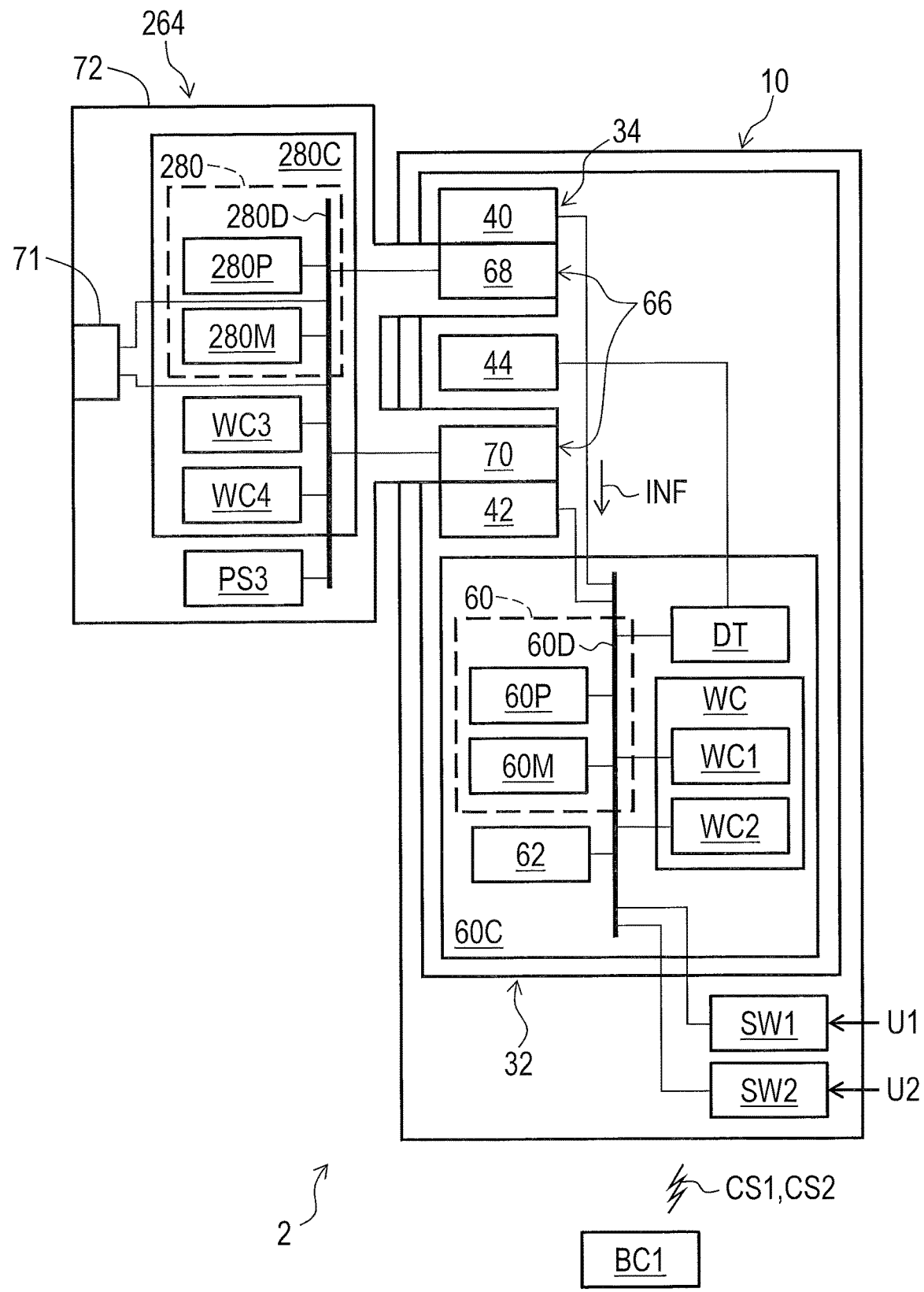
FIG. 22 is a schematic block diagram of the human-powered vehicle including the device illustrated in FIG. 16 (second state).

As seen in FIG. 22, the device 264 is attached to the electric device 32 after the device 264 receives the information from the external device ED via the wireless or wired communication channel and the information INF is stored in the memory 280M. The communication electrical contact 66 of the device 264 comes into contact with the electrical contact 34 of the electric device 32 when the device 264 is attached to the electric device 32. The controller 60 is configured to recognize the second state of the electrical contact 34 via the communication electrical contact 66 of the device 264 and the electrical contact 34 of the electric device 32. The additional controller 280 is configured to transmit the information INF to the controller 60 of the electric device 32 via the wired communicator WC4 of the device 264 and the wired communicator WC2 of the electric device 32 in the second state of the electrical contact 34. Thus, it is possible to transmit the information INF from the external device ED to the electric device 32 using the device 264 in a case where the electric device 32 is located far away from the external device ED.

Figure 23:
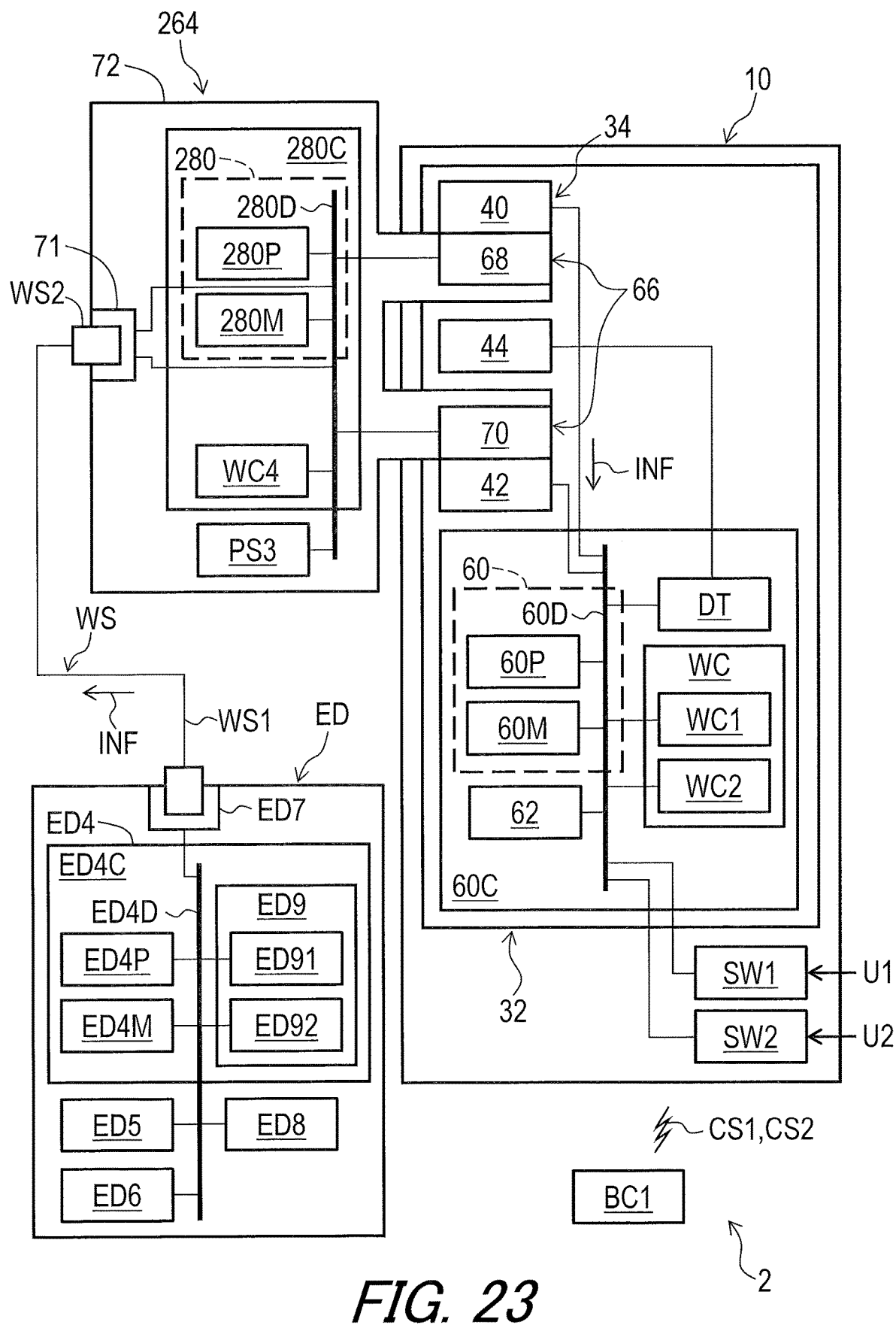
FIG. 23 is a schematic block diagram of the human-powered vehicle including a device in accordance with a modification (second state).
Figure 24:
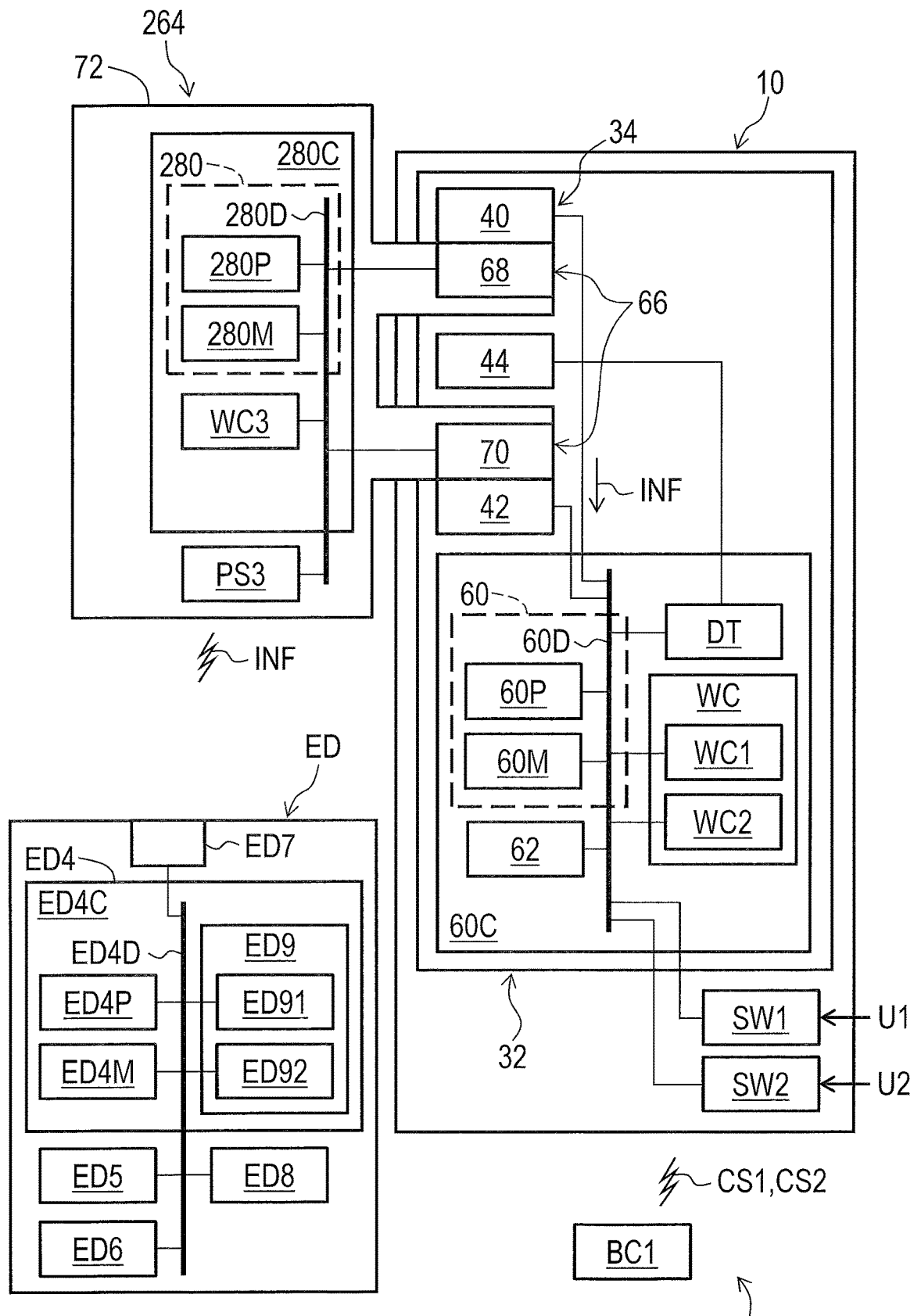
FIG. 24 is a schematic block diagram of the human-powered vehicle including a device in accordance with a modification (second state).

As seen in FIGS. 23 and 24, at least one of the wireless communicator WC3 and the wired communicator WC4 can be omitted from the device 264 if needed and/or desired. As seen in FIG. 24, in a case where the wired communicator WC4 is omitted from the device 264, the connection port 71 can be omitted from the device 264. However, the device 284 can include the connection port 71 in the modification depicted in FIG. 24.

In the second embodiment, the additional controller 280 is configured to store in the memory 280M the information INF received from the external device ED. However, the additional controller 280 of the device 264 can be configured not to store in the memory 280M the information INF received from the external device ED if needed and/or desired. The additional controller 280 can be omitted from the 264 as seen in FIG. 10.

In the first and second embodiments and the modifications thereof, the electric device 32 is used for the operating device 10. However, the electric device 32 can be used for the electric component BC1 or other devices if needed and/or desired. For example, the electric component BC1 can include a gear changing device (e.g., a front derailleur, a rear derailleur) and a rider-posture changing device (e.g., an adjustable seatpost, a suspension). The electric device 32 can be used for at least one of the gear changing device and the rider-posture changing device.

Figure 25:
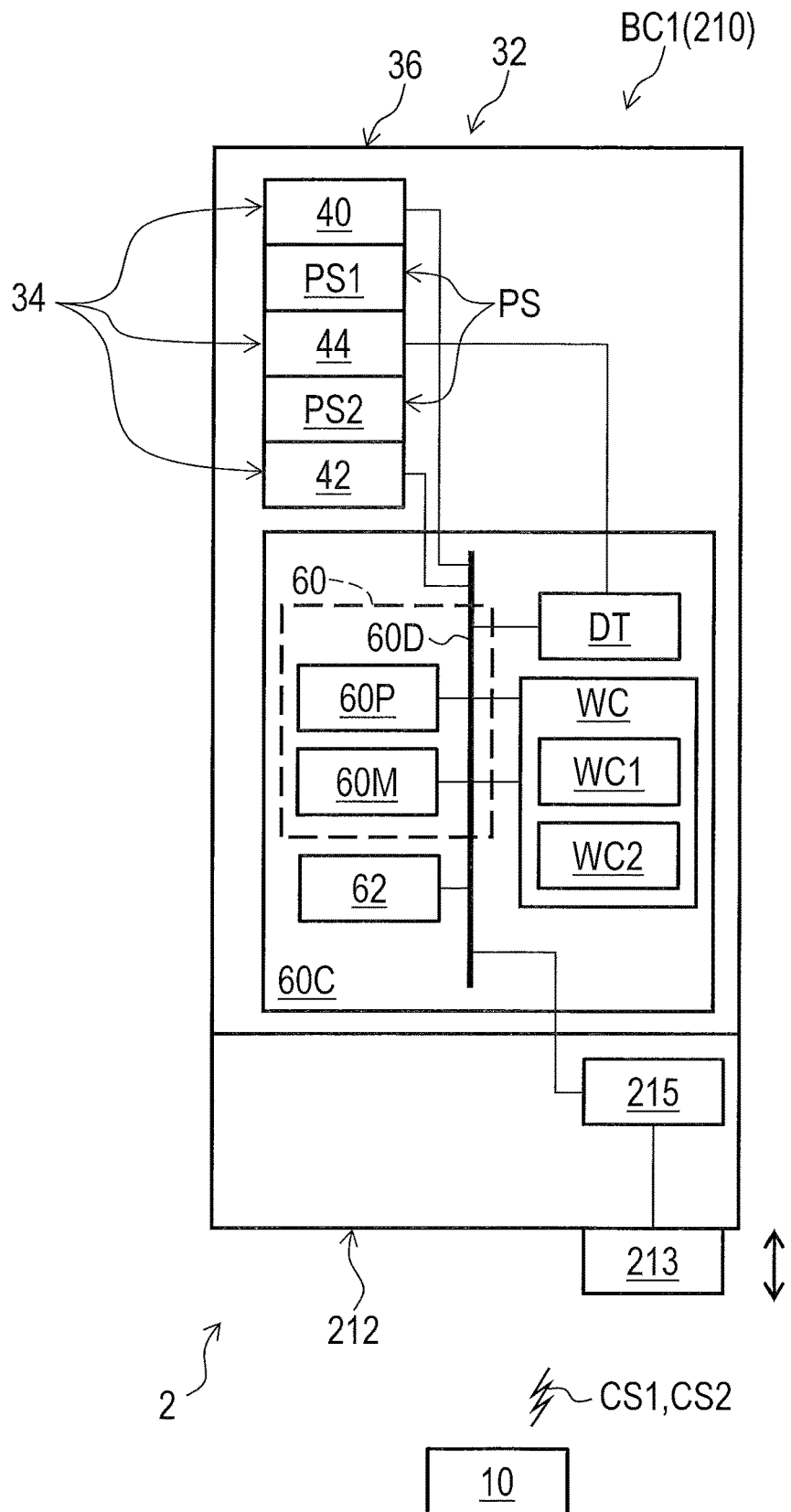
FIG. 25 is a schematic block diagram of the human-powered vehicle including the electric device and the device in accordance with a modification (first state).
Figure 26:
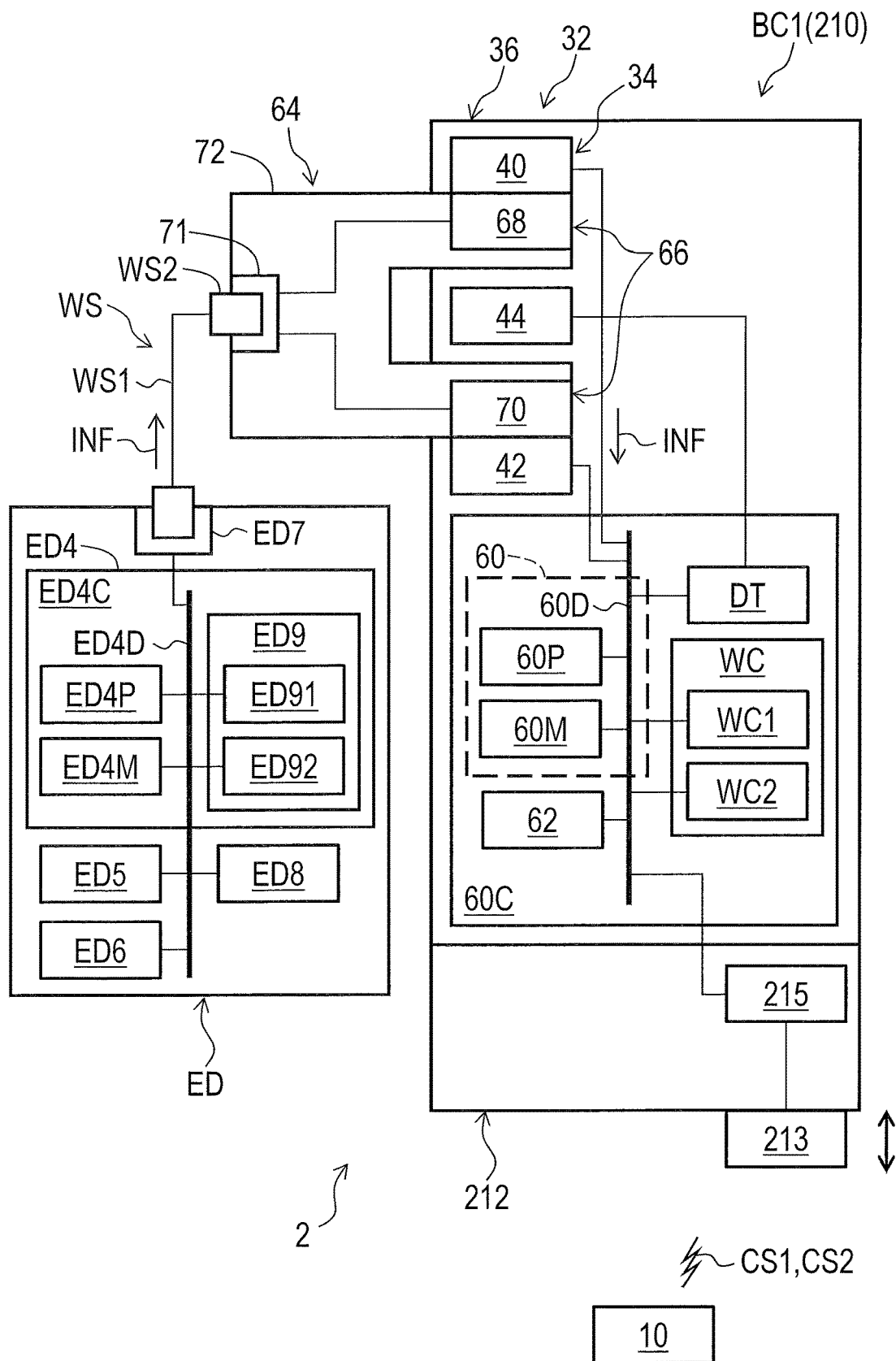
FIG. 26 is a schematic block diagram of the human-powered vehicle including the electric device and the device in accordance with a modification (second state).

As seen in FIG. 25, for example, a gear changing device 210 can include the electric device 32. The gear changing device 210 includes a base structure 212, a movable member 213, and an actuator 215. The base structure 12 is configured to be coupled to the vehicle body 4. The movable member 213 is movably coupled to the base structure 212. The actuator 215 is configured to move the movable member 213 relative to the base structure 212 to change a gear position of the gear changing device 210. For example, the movable member 213 is contactable with a chain. The actuator 215 is configured to move the chain via the movable member 213 relative to a sprocket assembly. For example, the actuator 215 includes a motor, a motor driver, and a position sensor. The actuator 215 is electrically connected to the electric device 32. The actuator 215 is electrically connected to the controller 60 of the electric device 32. The controller 60 is configured to control the actuator 215 to move the movable member 213 relative to the base structure 212 in response to the control signals CS1 and CS2. The actuator 215 is configured to receive electricity from the power supply PS via the electrical contact 34 in the first state. As seen in FIG. 26, the electric device 32 is configured to receive the information INF from the external device ED in the second state.

Figure 27:
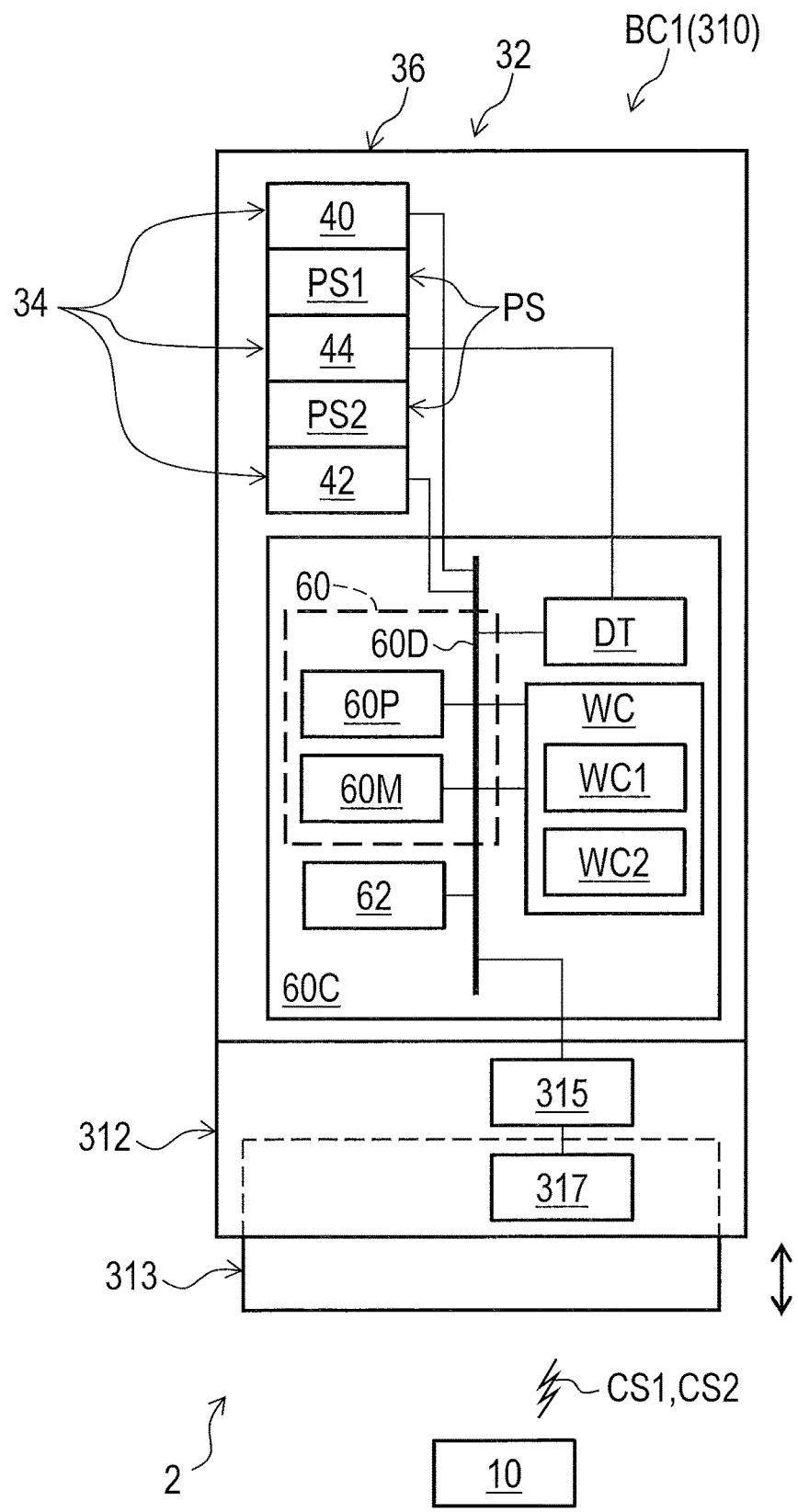
FIG. 27 is a schematic block diagram of the human-powered vehicle including the electric device and the device in accordance with a modification (first state).

As seen in FIG. 27, for example, a rider-posture changing device 310 can include the electric device 32. The rider-posture changing device 310 includes a base structure 312, a movable member 313, an actuator 315, and a positioning structure 317. The base structure 12 is configured to be coupled to the vehicle body 4. The movable member 313 is movably coupled to the base structure 312. For example, the base structure 313 has a tubular shape. The movable member 313 is movably received in the base structure 313. The positioning structure 317 has a lock state and a movable state. In the lock state, the positioning structure 317 restricts the movable member 313 from moving relative to the base structure 312. In the movable state, the positioning structure 317 allows the movable member 313 to move relative to the base structure 312. Examples of the positioning structure 312 include at least one a hydraulic valve structure and a gear structure (e.g., a rod screw assembly, a rack and pinion assembly).

The actuator 315 is configured to change the state of the positioning structure 317 between the lock state and the movable state in response to at least one of the control signals CS1 and CS2. For example, the actuator 315 includes a motor, a motor driver, and a position sensor. The actuator 315 is electrically connected to the electric device 32. The actuator 315 is electrically connected to the controller 60 of the electric device 32. The controller 60 is configured to control the actuator 315 to change the state of the positioning structure 317 between the lock state and the movable state in response to the control signals CS1 and CS2. For example, the controller 60 is configured to control the actuator 315 to change the state of the positioning structure 317 from the lock state to the movable state in response to the control signal CS1. The controller 60 is configured to control the actuator 315 to change the state of the positioning structure 317 from the movable state to the lock state in response to the control signal CS2. However, the controller 60 can be configured to control the actuator 315 to change the state of the positioning structure 317 from the lock state to the movable state while the controller 60 receives one of the control signals CS1 and CS2 from the operating device 10.

In a case where the rider-posture changing device 310 includes an adjustable seatpost, a saddle is coupled to the movable member 313. The height of the saddle is adjustable in the movable state.

In a case where the rider-posture changing device 310 includes a suspension, the rider-posture changing device 310 is configured to absorb and/or damp at least one of vibration and/or shock applied to the human-powered vehicle 2. The rest position of the movable member 313 is adjustable relative to the base structure 312 in the movable state.

Figure 28:
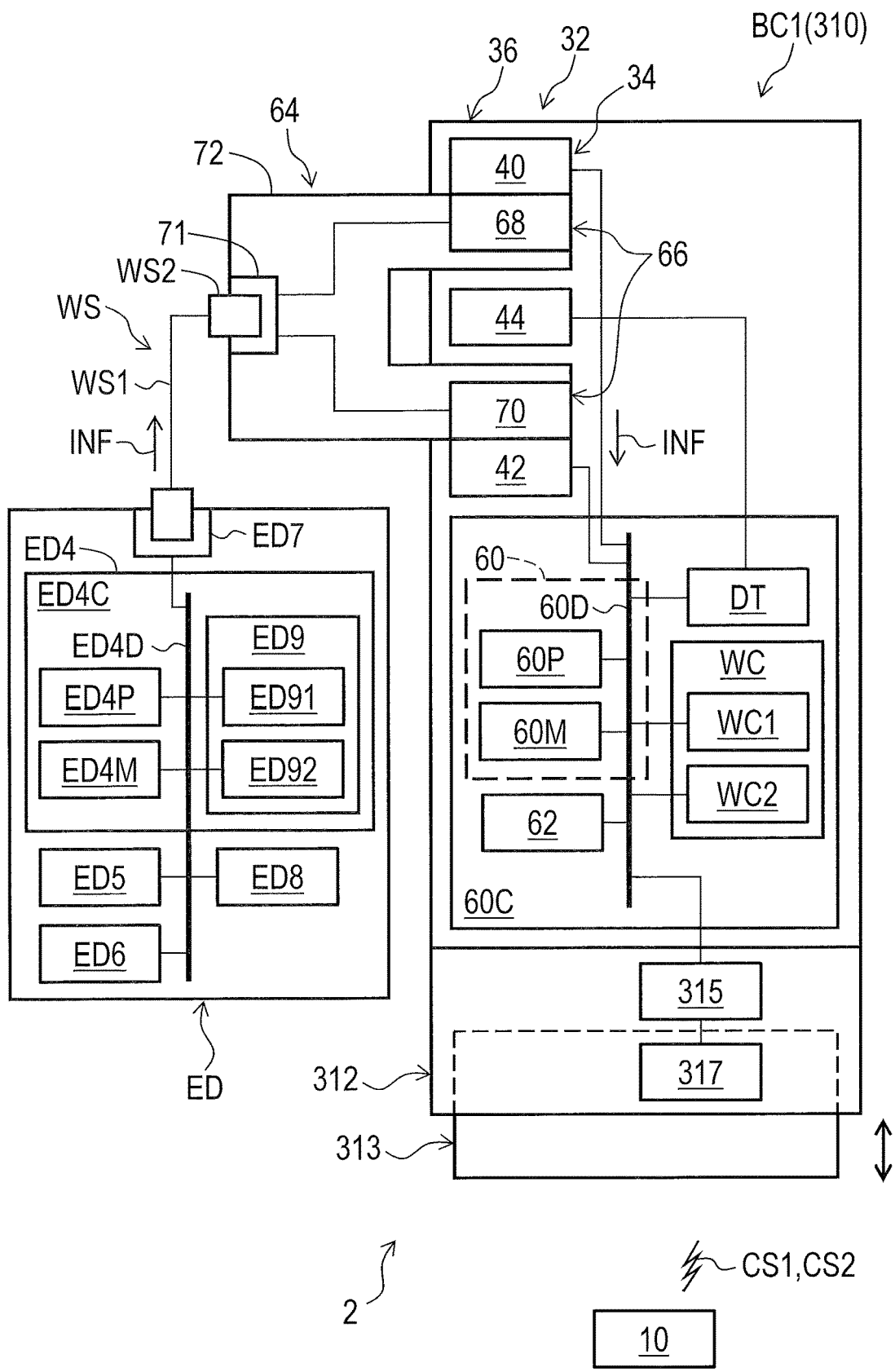
FIG. 28 is a schematic block diagram of the human-powered vehicle including the electric device and the device in accordance with a modification (second state).

The actuator 315 is configured to receive electricity from the power supply PS via the electrical contact 34 in the first state. As seen in FIG. 28, the electric device 32 is configured to receive the information INF from the external device ED in the second state.

In the present application, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have," "include" and their derivatives.

The terms "member," "section," "portion," "part," "element," "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element," and the term "second element" itself does not imply an existence of "first element."

The term "pair of," as used herein, can encompass the configuration in which the pair of elements have different shapes or structures from each other in addition to the configuration in which the pair of elements have the same shapes or structures as each other.

The terms "a" (or "an"), "one or more" and "at least one" can be used interchangeably herein.

The phrase "at least one of" as used in this disclosure means "one or more" of a desired choice. For one example, the phrase "at least one of" as used in this disclosure means "only one single choice" or "both of two choices" if the number of its choices is two. For other example, the phrase "at least one of" as used in this disclosure means "only one single choice" or "any combination of equal to or more than two choices" if the number of its choices is equal to or more than three. For instance, the phrase "at least one of A and B" encompasses (1) A alone, (2), B alone, and (3) both A and B. The phrase "at least one of A, B, and C" encompasses (1) A alone, (2), B alone, (3) C alone, (4) both A and B, (5) both B and C, (6) both A and C, and (7) all A, B, and C. In other words, the phrase "at least one of A and B" does not mean "at least one of A and at least one of B" in this disclosure.

Finally, terms of degree such as "substantially," "about" and "approximately" as used herein mean a reasonable amount of deviation of the modified term such that the end result is not significantly changed. All of numerical values described in the present application can be construed as including the terms such as "substantially," "about" and "approximately."

Obviously, numerous modifications and variations of the present invention are possible in light of the above teachings. It is therefore to be understood that within the scope of the appended claims, the invention may be practiced otherwise than as specifically described herein.

What is claimed is:

1. A device for a human-powered vehicle, comprising:
   a communication electrical contact contactable with an electrical contact of an electric device, the electrical contact having
   a first state where the electrical contact receives electricity from a power supply, and
   a second state where the electrical contact is in contact with the communication electrical contact,
   the communication electrical contact being configured to be in contact with the electrical contact to allow communication between an external device and the electric device via the communication electrical contact and the electrical contact in the second state of the electrical contact, wherein the communication electrical contact includes a first communication electrical contact and a second communication electrical contact,
the first communication electrical contact is contactable with a first electrical contact of the electrical contact, and
the second communication electrical contact is contactable with a second electrical contact of the electrical contact.

2. The device according to claim 1, further comprising
a connection port electrically connected to the communication electrical contact, wherein
the connection port is configured to be connected to a connector electrically connected to the external device.

3. The device according to claim 1, further comprising
a wired communicator electrically connected to the communication electrical contact to communicate with the electric device via the communication electrical contact.

4. The device according to claim 1, further comprising
an additional power supply electrically connected to the communication electrical contact to supply electricity to the electric device via the communication electrical contact and the electrical contact.

5. The device according to claim 1, further comprising
a wireless communicator electrically connected to the communication electrical contact to wirelessly communicate with the external device.

6. The device according to claim 5, further comprising
an additional power supply electrically connected to the wireless communicator to supply electricity to the wireless communicator.

7. The device according to claim 1, further comprising
a memory electrically connected to the communication electrical contact,
the memory being configured to store information received from the external device.

8. The device according to claim 1, wherein
the first communication electrical contact is spaced apart from the second communication electrical contact.

9. The device according to claim 8, wherein
the first communication electrical contact is spaced apart from the second communication electrical contact to define a recess between the first communication electrical contact and the second communication electrical contact.

10. The device according to claim 1, wherein
the electrical contact is configured to receive electricity and the information from the external device via the communication electrical contact in the second state of the electrical contact.

11. The device according to claim 1, further comprising
a base, wherein
the communication electrical contact is attached to the base.

12. The device according to claim 1, wherein
the communication electrical contact is configured to receive a voltage different from a power-supply voltage of the power supply.

13. A device for a human-powered vehicle, comprising:
a communication electrical contact contactable with an electrical contact of an electric device, the electrical contact having
a first state where the electrical contact receives electricity from a power supply, and
a second state where the electrical contact is in contact with the communication electrical contact,
the communication electrical contact being configured to be in contact with the electrical contact to allow communication between an external device and the electric device via the communication electrical contact and the electrical contact in the second state of the electrical contact, wherein
the communication electrical contact is configured to be at least partially provided in a space defined by the electrical contact of the electric device in the second state of the electrical contact.

14. A device for a human-powered vehicle, comprising:
a communication electrical contact contactable with an electrical contact of an electric device, the electrical contact having
a first state where the electrical contact receives electricity from a power supply, and
a second state where the electrical contact is in contact with the communication electrical contact; and
a base,
the communication electrical contact being configured to be in contact with the electrical contact to allow communication between an external device and the electric device via the communication electrical contact and the electrical contact in the second state of the electrical contact, wherein
the communication electrical contact is attached to the base, and
the base is configured to be at least partially provided in a space defined by the electrical contact of the electric device in the second state of the electrical contact.

15. A device for a human-powered vehicle, comprising:
a communication electrical contact contactable with an electrical contact of an electric device, the electrical contact having
a first state where the electrical contact receives electricity from a power supply, and
a second state where the electrical contact is in contact with the communication electrical contact; and
a base,
the communication electrical contact being configured to be in contact with the electrical contact to allow communication between an external device and the electric device via the communication electrical contact and the electrical contact in the second state of the electrical contact, wherein
the communication electrical contact is attached to the base,
the base includes a base body and a protruding body protruding from the base body, and
the protruding body is configured to be at least partially provided in a space defined by the electrical contact of the electric device in the second state of the electrical contact.

16. The device according to claim 15, wherein
the communication electrical contact is at least partially provided to the protruding body.

17. The device according to claim 15, wherein
the protruding body includes
a first protruding part protruding from the base body, the first protruding part being at least partially provided in the space in the second state of the electrical contact, and
a second protruding part protruding from the base body and spaced apart from the first protruding part, the second protruding part being at least partially provided in the space in the second state of the electrical contact.

18. The device according to claim 15, wherein
the protruding body includes an outer peripheral surface configured to be at least partially provided in the space in the second state of the electrical contact.

* * * * *